(12) United States Patent
Sekine

(10) Patent No.: US 6,580,486 B1
(45) Date of Patent: Jun. 17, 2003

(54) ACTIVE MATRIX LIQUID CRYSTAL DISPLAY DEVICE HAVING ELECTROSTATIC SHIELDING LAYER BETWEEN DATA LINES

(75) Inventor: Hiroyuki Sekine, Tokyo (JP)

(73) Assignee: NEC Corporation (JP)

( * ) Notice: Subject to any disclaimer, the term of this patent is extended or adjusted under 35 U.S.C. 154(b) by 234 days.

(21) Appl. No.: 09/604,610

(22) Filed: Jun. 27, 2000

(30) Foreign Application Priority Data

Jul. 2, 1999 (JP) .......................................... 11-189720

(51) Int. Cl.[7] .......................................... G02F 1/1343
(52) U.S. Cl. ...................... 349/139; 349/111; 349/149; 349/151
(58) Field of Search ........................... 349/40, 111, 139, 349/149, 151

(56) References Cited

U.S. PATENT DOCUMENTS

| | | | | |
|---|---|---|---|---|
| 5,822,028 A | * | 10/1998 | Miyawaki | 349/111 |
| 5,914,763 A | * | 6/1999 | Fujii et al. | 349/149 |
| 5,995,189 A | * | 11/1999 | Zhang | 349/153 |
| 6,011,608 A | * | 1/2000 | Tanaka | 349/153 |
| 6,346,976 B1 | * | 2/2002 | Komeno et al. | 349/139 |

FOREIGN PATENT DOCUMENTS

| | | | | |
|---|---|---|---|---|
| JP | 06-011684 | 1/1994 | | G02F/1/133 |
| JP | 10-325967 | 12/1998 | | G02F/1/136 |
| JP | 11-109400 | 4/1999 | | G02F/1/1345 |

* cited by examiner

*Primary Examiner*—Robert H. Kim
*Assistant Examiner*—Andrew Schechter
(74) *Attorney, Agent, or Firm*—Hayes Soloway P.C.

(57) ABSTRACT

Disclosed is an active matrix liquid crystal display device, comprising: a pixel matrix; a data driver circuit for driving data lines; and gate driver circuits for driving gate lines. These constituting elements are all manufactured on the same substrate, and the data driver circuit and the gate driver circuits are formed outside a sealing region located outside the pixel matrix. In this case, all data lines formed between the data driver circuit and the pixel matrix are substantially covered by at least one metal layer which is composed of a metal different from that of the data lines, wherein the metal layer is adapted to perform both light shielding and reduction of electrostatic coupling capacitance between the data lines. Thus, it is possible to improve image quality by reducing noise generated following voltage fluctuation between data lines without providing any new metal layers for shielding.

19 Claims, 14 Drawing Sheets

ACTIVE MATRIX LIQUID CRYSTAL DISPLAY DEVICE HAVING ELECTROSTATIC SHIELDING LAYER BETWEEN DATA LINES

BACKGROUND OF THE INVENTION

1. Field of the Invention

The present invention relates to an active matrix liquid crystal display device, and more particularly to a wiring structure of the active matrix liquid crystal display device.

This specification is based on Japanese Patent Application (Application No. Hei 11-189720), the content of which is incorporated herein by reference.

2. Description of the Related Art

FIG. 12 shows an example of the circuitry for a conventional active matrix liquid crystal display device. In the drawing, the active matrix liquid crystal display device includes pixels disposed at respective intersections between data lines K1 to Kn and gate lines G1 to Gm, which are respectively arranged longitudinally and latitudinally, a data driver circuit 200 provided to drive the data lines, and a gate driver circuit 202 provided to drive the gate lines. For each pixel, e.g., pixel 210 formed at the intersection between the gate line Gi and the data line Kj, the pixel is composed of a pixel transistor 212 having a gate connected to the gate line Gi and a source connected to the data line Kj, and liquid crystal capacitance 214 and storage capacitance 216, which are interconnected through the pixel transistor 212.

In the active matrix liquid crystal display device shown in FIG. 12, a polysilicon thin-film transistor is used for the pixel transistor, and the data driver circuit 200 and the gate driver circuit 202 are integrally formed on the same glass substrate as that of the pixel matrix. The data driver circuit 200 is composed of a scanning circuit 222 and an analog switch array 224.

In the foregoing active matrix liquid crystal display device including the driver circuits incorporated therein, a block at a time addressing system is typically used in order to simplify the configuration of the data driver circuit. As shown in FIG. 12, this driving system is a data line driving system adapted to divide data lines into unit blocks, each block being composed of a plurality of lines (4 lines in the shown example); spread video signals in parallel with the data lines of each block; the number of video signal lines being equal to the number of data lines in each block; and then supply the video signals to the data lines through video signal wiring.

In FIG. 12, for example, the blocks are formed such that data lines K1 to K4 constitute a block 1, data lines K5 to KS constitute a block 2, and so on. The data lines K1 to K4 and the data lines K5 to K8 are connected to video signal lines BL1 to BL4, to which video signals are supplied, respectively through the switch transistors Q1 to Q4 and the switch transistors Q5 to Q8 of the analog switch array 224. The same applies to the other blocks. In each block, for all the switch transistors of the analog switch array 224, to which each data line is connected, gates are connected in common, and each gate is connected to one output terminal SPi (i=1 to k) of the scanning circuit 222.

Now, a description will be made of an operation during the block-at-a-time addressing of the active matrix liquid crystal display device constructed in the foregoing manner by referring to a timing chart of FIG. 13. It is assumed that the period for supplying video signals equivalent to one line to be displayed by the liquid crystal display device to data lines K1 to Kn is one horizontal scanning period TH. In one horizontal scanning period TH, the scanning circuit 222 in the data driver circuit 200 sequentially outputs scanning pulses from the output terminals SPi to SPk in synchronization with clock signals DCLK1 and DCLK2 used to control the scanning circuit 222. By these scanning pulses, the switch transistors of the analog switch array 224 are respectively switched ON/OFF by block units.

Then, video signals Vsig equal in number to that of data lines (4 lines in the example of FIG. 12) in one, block are spread in parallel, and input from in-put terminals V1 to V4. Then, the switch transistors of the analog switch array 224 are respectively switched ON/OFF by block units, and thus the video signals are input to the data lines by block units. Such an operation is performed for all the blocks and, in one horizontal scanning period TH, a gate line Gx (x=1 to m) having the gate driver circuit 202 located thereon is driven to a voltage (high level in the example shown in FIG. 12) for switching ON the pixel transistor. As a result, the video signals equivalent to one line are written in the pixels. Further, by performing such an operation sequentially for all the gate lines, two dimensional videos can be displayed on the liquid crystal display device. In FIG. 13, a signal DST denotes a reference signal for defining one horizontal scanning period.

FIG. 14 shows a configuration of a conventional example of an active matrix liquid crystal display device, which includes a precharge circuit 204 provided in a side opposite to the data driver circuit 200, sandwiching a pixel matrix to reset the data lines K1 to Kn before the video signals are written therein in FIG. 12. The precharge circuit 204 is composed of switch transistors N1 to Nn having sources connected to the end portions of the data lines K1 to En and gates connected in common. The drains of the switch transistors N1 to Nn are connected in common, and a precharge signal PCG is input to each gate.

The active matrix liquid crystal display device shown in FIG. 14 is different in operation from the active matrix liquid crystal display device of FIG. 12 in the following respects. The output of the gate driver circuit 202 is made during a horizontal blanking period as a period of outputting no video signals, which is included in one horizontal scanning period. During the horizontal blanking period, the device operates to return the output to a potential for switching OFF all the pixel transistors. While the pixel transistors are in OFF states, precharge signals PCG are applied to the switch transistors N1 to Nn to simultaneously switch ON the switch transistors N1 to Nn constituting the precharge circuit 204. All the data lines K1 to Kn are charged to specified potentials. Other operations are the same as those of the active matrix liquid crystal display device shown in FIG. 12, and thus description thereof will be omitted to prevent repetition.

As described above, block-at-a-time addressing is performed in the conventional active matrix liquid crystal display device. However, in such block-at-a-time addressing, in the block boundary-portion of the adjacent data lines of the liquid crystal matrix, a luminance change occurs because of noise (block noise) generated during switching in the analog switching array of the data driver circuit, which results in the appearance of uneven lines.

To exemplify the above problem, reference is made again to FIG. 12. Through the data lines of the first block, video signals are written in the pixels connected to the respective data lines and, at a next timing, the video signals are written in the respective pixels connected to the data lines, which belong to the second block adjacent to the first block. During the writing of the video signals in the respective pixels connected to the data lines of the second block, the switch transistors Q1 to Q4, constituting the analog switch connected to the data lines of the first block, are in OFF states, and the data lines K1 to K4, belonging to the first block, are in floating states for potentials.

When the switch transistors Q5 to Q8 connected to the data lines of the second block are switched ON and, through the data lines K5 to K8 of the second block, the video signals are written in the pixels connected to the data lines K5 to K8, fluctuation occurs in the potentials of the data lines K5 to K8. Following the potential fluctuation, the data lines K1 to K4 of the first block are also subjected to potential fluctuation because of spatial capacitive coupling with the data lines K5 to K8 of the second block. This situation causes the foregoing problem of block noise.

Another problem inherent in the conventional active matrix liquid crystal display device is the long wiring distance between each driver circuit and the pixel matrix. FIG. 15 schematically shows a structure of the conventional active matrix liquid crystal display device. In the drawing, the active matrix liquid crystal display device is manufactured by attaching a TFT substrate 250 to an opposed substrate 252 by a sealing material, the TFT substrate 250 having a thin-film transistor (TFT) formed as a pixel transistor, and the opposed substrate 252 having common electrode, and then filling liquid crystals in a gap between the two substrates and sealing the gap.

The liquid crystal display device having a driver incorporated therein includes a data driver circuit 200 and gate driver circuits 202 and 206 formed on a glass substrate (TFT substrate); the respective driver circuits, i.e., the data driver circuit 200 and the gate driver circuits 202 and 206 shown in FIG. 15 are generally provided outside a sealing region 254. If the driver circuits are provided inside the sealing region, then voltages supplied to the driver circuits subject liquid crystal molecules to electrolysis, generate impurity ions, and cause deterioration of display images. To prevent this situation, the driver circuits should be provided outside the sealing region.

Another reason for the installation of the data driver circuit 200 and the gate driver circuits 202 and 206 outside the sealing region 254 is as follows. Beads called spacers are scattered between the TFT substrate 250 and the opposed substrate 252 in order to control a gap therebetween, which is filed with the liquid crystals inside the sealing region. If the spacers are placed on the driver circuit, then large pressures are applied only to portions having the spacers when the opposed substrate 252 is laminated on the TFT substrate 250 and attached by applying a pressure. Consequently, short-circuiting occurs between metal layers in the driver circuit, and yield is reduced. To prevent such a situation, the driver circuits should be installed outside the sealing region.

For the foregoing reasons, the wiring distance from the data driver circuit 200 to the pixel, matrix 256, or from the gate driver circuits 202 and 206 to the pixel matrix 256, is limited by the sealing width of the sealing region 254, and becomes longer. Thus, electrostatic coupling capacitance between the data lines is increased and, during block-at-a-time addressing, noise is generated following the voltage fluctuation of the other data lines due to the electrostatic coupling capacitance, resulting in the problem of image quality degradation.

The electrostatic coupling capacitance between the data lines may conceivably be reduced by shielding the data lines from the data driver circuit to the pixel matrix. However, the installation of new metal layers to shield the data lines increases the number of manufacturing steps, and results in a complex device structure.

SUMMARY OF THE INVENTION

The present invention was made with the foregoing problems in mind, and it is an object of the present invention to provide an active matrix liquid crystal display device capable of reducing noise generated following voltage fluctuation between data lines and improving image quality without providing any new metal layers for shielding.

FIG. 16 shows a device structure of an active matrix liquid crystal display device for a projector, to which the present invention is applied. The active matrix liquid crystal display device for a projector is irradiated with a strong light to achieve high luminance. The irradiation of a strong light to a pixel thin-film transistor (TFT) results in problems including a reduction in contrast caused by a light leaking current, a generation of vertical crosstalk, and so on. In some cases, accordingly, to prevent the pixel thin-film transistor from being irradiated with a light, upper and lower light shielding metal films 318 and 302 may respectively be provided in the upper and lower portions of the pixel thin-film transistor (a gate is formed by a gate metal film 310, and drain and source regions are formed in a polysilicon layer 306 located below the gate metal film). In the drawing, reference numeral 300 denotes a glass substrate; numeral 304, an insulating film; numeral 308, a gate insulating film; numeral 312, a first interlayer insulating film; numeral 314, a metal film for forming data lines; numeral 316, a second interlayer insulating film; numeral 320, an insulating film; and numeral 322, a transparent electrode film.

According to the present invention, electrostatic coupling capacitance between the data lines is reduced by using metal layers to shield the data lines, which are necessary for structuring the device for purposes other than shielding for wiring, like the lower and upper light shielding metal films 302 and 318.

In order to achieve the foregoing object, an active matrix liquid crystal display device of the present invention comprises: a pixel matrix composed of pixel transistors and pixels that have liquid crystal capacitance and storage capacitance connected to data lines through the pixel transistors, which are disposed at respective intersections between the data lines and gate lines arranged longitudinally and latitudinally, respectively; a data driver circuit for driving the data lines; and gate driver circuits for driving the gate lines. The above elements are all manufactured on the same substrate, and the data driver circuit and the gate driver circuits are formed outside a sealing region located outside the pixel matrix. In this case, all the data lines formed between the data driver circuit and the pixel matrix are covered so as to be surrounded by a metal layer formed for a purpose other than shielding and having a metal different from that of the data lines.

According to the present invention, the active matrix liquid crystal display device comprises: the pixel matrix composed of the pixel transistors and the pixels that have liquid crystal capacitance and storage capacitance connected to the data lines through the pixel transistors, which are disposed at the respective intersections between the data lines and the gate lines arranged longitudinally and latitudinally, respectively; the data driver circuit for driving the data lines; and the gate driver circuits for driving the gate lines. The above elements are all manufactured on the same substrate, and the data driver circuit and the gate driver circuits are formed outside the sealing region located outside the pixel matrix. In this case, all the data lines formed between the data driver circuit and the pixel matrix are covered so as to be surrounded by the metal layer formed for the purpose other than shielding and having a metal different from that of the data lines. Thus, electrostatic coupling capacitance between the data lines can be reduced without providing any new metal layers for shielding. Accordingly, it is possible to reduce noise generated following voltage fluctuation between the data lines, and to improve image quality.

Moreover, since it is not necessary to provide any new metal layers for shielding, it is not necessary to increase the number of manufacturing steps and it is possible to prevent the device structure from becoming complex.

An active matrix liquid crystal display device of the present invention comprises: a pixel matrix composed of pixel transistors and pixels that have liquid crystal capacitance and storage capacitance connected to data lines through the pixel transistors, which are disposed at respective intersections between the data lines and gate lines arranged longitudinally and latitudinally, respectively; a data driver circuit for driving the data lines; and gate driver circuits for driving the gate lines. The above elements are all manufactured on the same substrate, and the data driver circuit and the gate driver circuits are formed outside a sealing region located outside the pixel matrix. In this case, between the data lines formed between the data driver circuit and the pixel matrix, shield wiring by a metal layer having a metal different from that of the data lines and formed for a purpose other than shielding is provided in such a manner that overlapping with the data lines is prevented.

According to the present invention, the active matrix liquid crystal display device comprises: the pixel matrix composed of the pixel transistors and the pixels that have liquid crystal capacitance and storage capacitance connected to the data lines through the pixel transistors, which are disposed at the respective intersections between the data lines and the gate lines arranged longitudinally and latitudinally, respectively; the data driver circuit for driving the data lines; and the gate driver circuits for driving the gate lines. The above elements are all manufactured on the same substrate, and the data driver circuit and the gate driver circuits are formed outside the sealing region located outside the pixel matrix. In this case, between the data lines formed between the data driver circuit and the pixel matrix, the shield wiring by the metal layers having a metal different from that of the data lines and formed for the purpose other than shielding is provided in such a manner that overlapping with the data lines is prevented. Thus, electrostatic coupling capacitance between the data lines can be reduced without providing any new metal layers for shielding. Accordingly, it is possible to reduce noise generated following voltage fluctuation between the data lines, and to improve image quality.

Moreover, since it is not necessary to provide any new metal layers for shielding, it is not necessary to increase the number of manufacturing steps and it is possible to prevent the device structure from becoming complex.

An active matrix liquid crystal display device of the present invention comprises: a pixel matrix composed of pixel transistors and pixels that have liquid crystal capacitance and storage capacitance connected to data lines through the pixel transistors, which are disposed at respective intersections between the data lines and gate lines arranged longitudinally and latitudinally, respectively; a data driver circuit for driving the data lines; and gate driver circuits for driving the gate lines. The above elements are all manufactured on the same substrate, and the data driver circuit and the gate driver circuits are formed outside a sealing region located outside the pixel matrix. In this case, between the data lines formed between the data driver circuit and the pixel matrix, shield wiring by a metal layer having the same metal as that of the data lines is provided in such a manner that overlapping with the data lines is prevented.

According to the present invention, the active matrix liquid crystal display device comprises: the pixel matrix composed of the pixel transistors and the pixels that have liquid crystal capacitance and storage capacitance connected to the data lines through the pixel transistors, which are disposed at the respective intersections between the data lines and the gate lines arranged longitudinally and latitudinally, respectively; the data driver circuit for driving the data lines; and the gate driver circuits for driving the gate lines. The above elements are all manufactured on the same substrate, and the data driver circuit and the gate driver circuits are formed outside the sealing region located outside the pixel matrix. In this case, between the data lines formed between the data driver circuit and the pixel matrix, the shield wiring by the metal layer having the same metal as that of the data lines is provided in such a manner that overlapping with the data lines is prevented. Thus, electrostatic coupling capacitance between the data lines can be reduced without providing any new metal layers for shielding. Accordingly, it is possible to reduce noise generated following voltage fluctuation between the data lines, and to improve image quality.

Moreover, since it is not necessary to provide any new metal layers for shielding, it is not necessary to increase the number of manufacturing steps and it is possible to prevent the device structure from becoming complex.

Furthermore, according to the present invention, a shielding structure of the gate lines formed between the gate driver circuits and the pixel matrix is formed to be the same as that of the data lines.

According to the present invention, since the shielding structure of the gate lines formed between the gate driver circuits and the pixel matrix is formed to be the same as that of the data lines, it is possible to uniformly pressurize the sealing region when the substrate having the pixel transistor formed thereon and an opposed substrate thereof is laminated, and to keep the gap to be filled with liquid crystals uniformly.

Furthermore, according to the present invention, in a side opposite to the data driver circuit of the pixel matrix, pseudo-wiring having the same shielding structure as that of the data lines is provided so as to be extended from the pixel matrix to a peripheral edge side of the substrate.

According to the present invention, since in the side opposite to the data driver circuit of the pixel matrix, the pseudo-wiring having the same shielding structure as that of the data lines is provided so as to be extended from the pixel matrix to the peripheral edge side of the substrate, it is possible to more uniformly pressurize the sealing region when the substrate having the pixel transistor formed thereon and the opposed substrate thereof is laminated, and to keep uniform a gap to be filled with liquid crystals.

An active matrix liquid crystal display device of the present invention comprises: a pixel matrix composed of pixel transistors and pixels that have liquid crystal capacitance and storage capacitance connected to data lines through the pixel transistors, which are disposed at respective intersections between the data lines and gate lines arranged longitudinally and latitudinally, respectively; a data driver circuit for driving the data lines: gate driver circuits for driving the gate lines; and a precharge circuit for precharging the data lines. The above elements are all manufactured on the same substrate, and the data driver circuit and the gate driver circuits are formed outside a sealing region located outside the pixel matrix. In this case, all the data lines formed between the data driver circuit and the pixel matrix, all the data lines formed between the precharge circuit and the pixel matrix, and all pseudo-wiring of a metal layer having the same metal as that of the data lines disposed from the precharge circuit toward a peripheral edge portion of the substrate are covered so as to be respectively surrounded by using a metal layer different from that of the data lines formed for purposes other than shielding.

According to the present invention, the active matrix liquid crystal display device comprises: the pixel matrix composed of the pixel transistors and the pixels that have liquid crystal capacitance and storage capacitance connected to the data lines through the pixel transistors, which are disposed at the respective intersections between the data lines and the gate lines arranged longitudinally and latitudinally, respectively; the data driver circuit for driving the data lines; the gate driver circuits for driving the gate lines; and the precharge circuit for precharging the data lines. The above elements are all manufactured on the same substrate, and the data driver circuit and the gate driver circuits are formed outside the sealing region located outside the pixel matrix. In this case, all the data lines formed between the data driver circuit and the pixel matrix, all the data lines formed between the precharge circuit and the pixel matrix, and all the pseudo-wiring of the metal layer having the same metal as that of the data lines disposed from the precharge circuit toward the peripheral edge portion of the substrate are covered so as to be respectively surrounded by using a metal layer different from that of the data lines formed for purposes other than shielding. Thus, electrostatic coupling capacitance between the data lines can be reduced without providing any new metal layers for shielding. Accordingly, it is possible to reduce noise generated following voltage fluctuation between the data lines, and to improve image quality. Moreover, since it is not necessary to provide any new metal layers for shielding, it is not necessary to increase the number of manufacturing steps and it is possible to prevent the device structure from becoming complex.

An active matrix liquid crystal display device of the present invention comprises: a pixel matrix composed of pixel transistors and pixels that have liquid crystal capacitance and storage capacitance connected to data lines through the pixel transistors, which are disposed at respective intersections between the data lines and gate lines arranged longitudinally and latitudinally, respectively; a data driver circuit for driving the data lines; gate driver circuits for driving the gate lines; and a precharge circuit for precharging the data lines. The above elements are all manufactured on the same substrate, and the data driver circuit and the gate driver circuits being formed outside a sealing region located outside the pixel matrix. In this case, respectively between the data lines formed between the data driver circuit and the pixel matrix, between the data lines formed between the precharge circuit and the pixel matrix, and between pseudo-wiring of a metal layers having the same metal as that of the data lines disposed from the precharge circuit toward a peripheral edge portion of the substrate, shield wiring by metal layers having a metal different from that of the data lines and the pseudo-wiring and formed for purposes other than shielding are provided in such a manner that overlapping with the data lines is prevented.

According to the present invention, the active matrix liquid crystal display device comprises: the pixel matrix composed of the pixel transistors and the pixels that have liquid crystal capacitance and storage capacitance connected to the data lines through the pixel transistors, which are disposed at the respective intersections between the data lines and the gate lines arranged longitudinally and latitudinally, respectively; the data driver circuit for driving the data lines; the gate driver circuits for driving the gate lines; and the precharge circuit for precharging the data lines. The above elements are all manufactured on the same substrate, and the data driver circuit and the gate driver circuits are formed outside the sealing region located outside the pixel matrix. In this case, respectively between the data lines formed between the data driver circuit and the pixel matrix, between the data lines formed between the precharge circuit and the pixel matrix, and between the pseudo-wiring of the metal layers having the same metal as that of the data lines disposed from the precharge circuit toward the peripheral edge portion of the substrate, the shield wiring by the metal layers having a metal different from that of the data lines and the pseudo-wiring and formed for purposes other than shielding are provided in such a manner that overlapping with the data lines is prevented. Thus, electrostatic coupling capacitance between the data lines can be reduced without providing any new metal layers for shielding. Accordingly, it is possible to reduce noise generated following voltage fluctuation between the data lines, and to improve image quality Moreover, since it is not necessary to provide any new metal layers for shielding, it is not necessary to increase the number of manufacturing steps and it is possible to prevent the device structure from becoming complex.

An active matrix liquid crystal display device of the present invention comprises: a pixel matrix composed of pixel transistors and pixels that have liquid crystal capacitance and storage capacitance connected to data lines through the pixel transistors, which are disposed at respective intersections between the data lines and gate lines arranged longitudinally and latitudinally, respectively; a data driver circuit for driving the data lines; gate driver circuits for driving the gate lines; and a precharge circuit for precharging the data lines. The above elements are all manufactured on the same substrate, and the data driver circuit and the gate driver circuits are formed outside a sealing region located outside the pixel matrix. In this case, respectively between the data lines formed between the data driver circuit and the pixel matrix, between the data lines formed between the precharge circuit and the pixel matrix, and between pseudo-wiring of metal layers having the same metal as that of the data lines disposed from the precharge circuit toward a peripheral edge portion of the substrate, shield wiring by metal layers having the same metal as that of the data lines, and formed for purposes other than shielding are provided in such a manner that overlapping with the data lines and the pseudo-wiring is prevented.

According to the present invention, the active matrix liquid crystal display device comprises: the pixel matrix composed of the pixel transistors and the pixels that have liquid crystal capacitance and storage capacitance connected to the data lines through the pixel transistors, which are disposed at the respective intersections between the data lines and the gate lines arranged longitudinally and latitudinally, respectively; the data driver circuit for driving the data lines; the gate driver circuits for driving the gate lines; and the precharge circuit for precharging the data lines. The above elements are all manufactured on the same substrate, and the data driver circuit and the gate driver circuits are formed outside the sealing region located outside the pixel matrix. In this case, respectively between the data lines formed between the data driver circuit and the pixel matrix, between the data lines formed between the precharge circuit and the pixel matrix, and between the pseudo-wiring of the metal layer having the same metal as that of the data lines disposed from the precharge circuit toward the peripheral edge portion of the substrate, the shield wiring by the metal layers having the same metal as that of the data lines and formed for purposes other than shielding are provided in such a manner that overlapping with the data lines and the pseudo-wiring is prevented. Thus, electrostatic coupling capacitance between the data lines can be reduced without providing any new metal layers for shielding. Accordingly, it is possible to reduce noise generated following voltage fluctuation between the data lines, and to improve image quality.

Moreover, since it is not necessary to provide any new metal layers for shielding, it is not necessary to increase the number of manufacturing steps and it is possible to prevent the device structure from becoming complex.

Furthermore according to the present invention, a shielding structure of the gate lines formed between the gate driver circuits and the pixel matrix is formed to be the same as that of the data lines.

According to the present invention, since the shielding structure of the gate lines formed between the gate driver circuits and the pixel matrix is formed to be the same as that of the data lines, it is possible to uniformly pressurize the sealing region when the substrate having the pixel transistor formed thereon and the opposed substrate thereof are laminated. Local pressurizing can prevent the occurrence of short-circuiting between the data lines and the shield wiring.

BRIEF DESCRIPTION OF THE DRAWINGS

For a more complete understanding of the present invention and the advantages thereof, reference is now made to the following description taken in conjunction with the accompanying drawings.

PREFERRED EMBODIMENTS OF THE INVENTION

Figure 1:
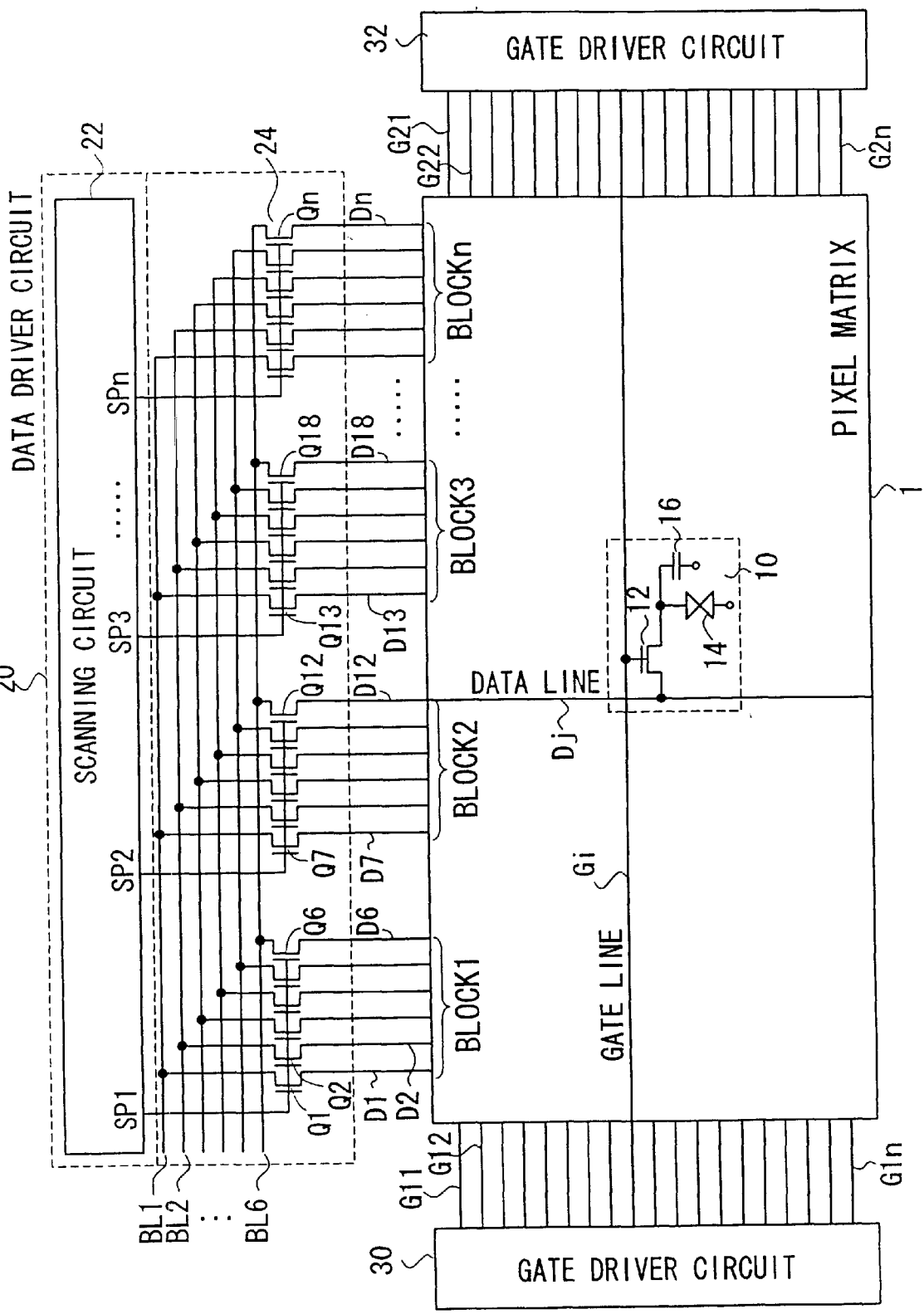
FIG. 1 shows a circuit diagram showing the circuitry of an active matrix liquid crystal display device according to a first embodiment of the present invention.

Next, detailed description will be made for the preferred embodiments of the present invention with reference to the accompanying drawings. FIG. 1 shows the circuitry of an active matrix liquid crystal display device according to a first embodiment of the present invention. In the drawing, the active matrix liquid crystal display device comprises: a pixel matrix 1 composed of pixels that have pixel transistors, liquid crystal capacitance and storage capacitance, which are disposed at respective intersections between data lines D1 to Dn and gate lines G11 to G1$n$ and G21 to G2$n$ arranged longitudinally and latitudinally, respectively; a data driver circuit 20 for driving the data lines D1 to Dn; and gate driver circuits 30 and 32 for driving the gate lines G11 to G1$n$ and G21 to G2$n$.

Regarding each pixel, e.g., a pixel 10 formed at an intersection between the data line Dj and the gate line Gi in FIG. 1, the pixel is composed of a pixel thin-film transistor (TFT) 12 having a gate connected to the gate line Gi and a source connected to the data line Dj, and liquid crystal capacitance 14 and storage capacitance 16 connected to a drain of the pixel thin-film transistor 12.

The data driver circuit 20 includes a scanning circuit 22 and an analog switch array 24. In the embodiment, the data lines D1 to Dn are divided into blocks, each of which has 6 lines, i.e., into blocks 1 to n.

The data lines D1 to Dn are connected by block units to video signal lines BL1 to BL6, to which video signals are supplied through switch transistors constituting the analog switch array 24. Specifically, to take as an example Block1, the data lines D1 to D6 are connected through switch transistors Q1 to Q6 to the video signal lines BL1 to BL6.

For the switch transistors Q1 to Qn constituting the analog switch array 24, a gate is connected in common for each block and, from the output terminals SP1 to SPn of the scanning circuit 22, scanning pulses are input to perform block-at-a-time addressing for the data lines.

The pixel matrix 1, the data driver circuit 20 and the gate driver circuits 30 and 32 are manufactured on the same substrate. For the reasons described above in the description of the related art, each driver circuit of the data driver circuit 20 and the gate driver circuits 30 and 32 is provided outside a sealing region (not illustrated), which is located outside the pixel matrix 1.

All the data lines D1 to Dn formed between the analog switch array 24 and the pixel matrix 1 in the data driver circuit 20 are covered by using metal layers different from those of data lines formed for a purpose other than shielding. This state is shown in FIG. 2.

Figure 2:
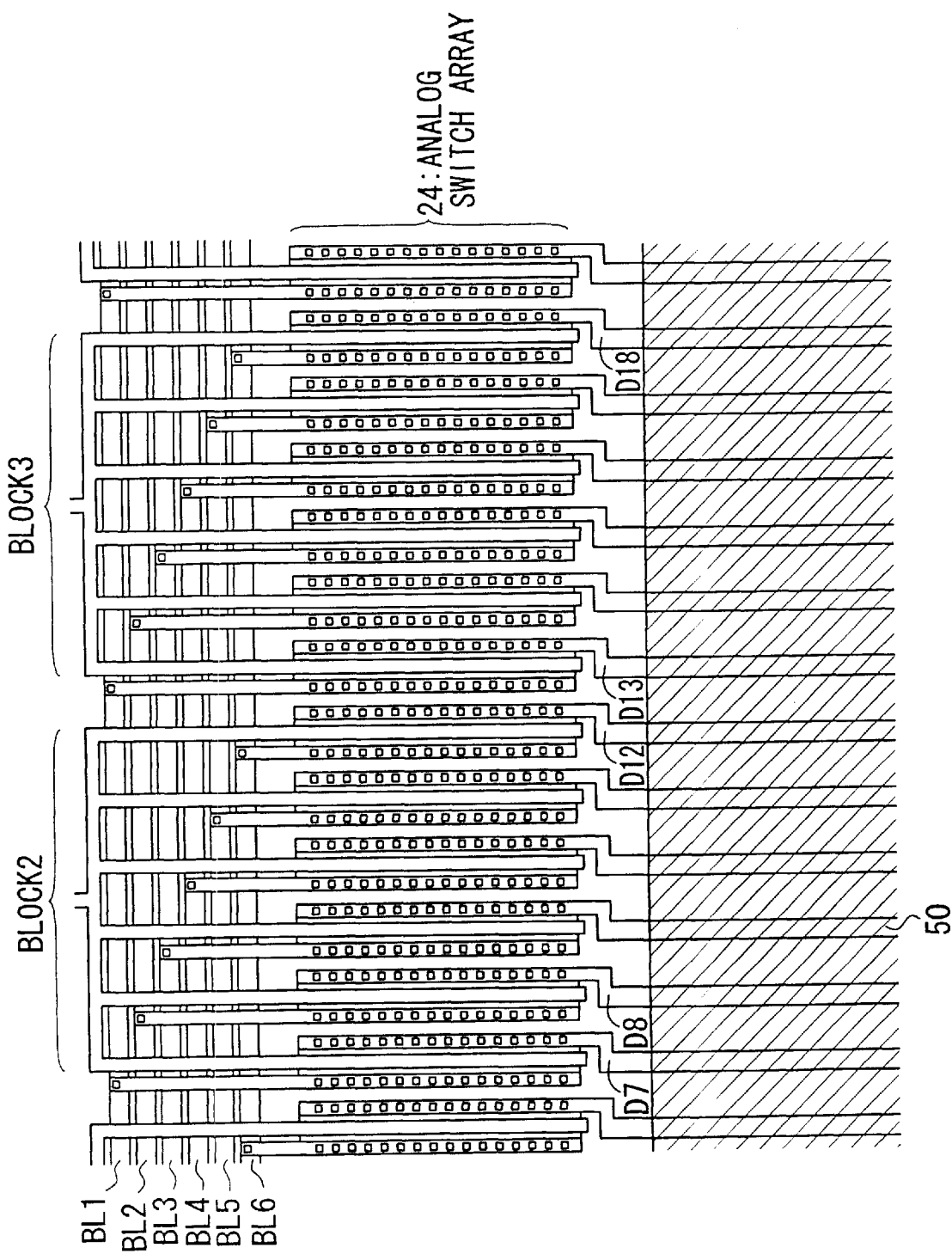
FIG. 2 shows the layout of wiring from an analog switch array to a pixel matrix in the data driver circuit of FIG. 1.

FIG. 2 is a layout view showing wiring from the analog switch array 24 to the pixel matrix 1 in the data driver circuit 20. FIG. 2 shows only portions of the blocks 2 and 3 of the data lines of FIG. 1. In the drawing, a center portion indicates the analog switch array 24 in the data driver circuit 20 and, in this portion, switching transistors Q7 to Q12 and Q13 to Q18 are formed to perform block-at-a-time addressing for the data lines D7 to D12 (Block2) and D13 to D18 (Block3).

Most of the portions of the data lines D7 to D18 in a longitudinal direction are located on the upper and lower layers thereof. These lines are covered so as to be surrounded by a metal layer 50 having a metal different from that of the data lines. For the longitudinal direction of the data lines D7 to D18, in FIG. 2, only a portion is shown for convenience of explanation, and the length of each of the data lines D7 to D8 is equal to or longer than the width of the sealing region coated with a sealing material.

Further, all the data lines D1 to Dn from the analog switch array 24 to the pixel matrix 1 are covered with the metal layer 50, but only a portion is shown in FIG. 2 for convenience of explanation. In practice, the metal layer 50 is composed of two kinds of metal layers (upper and lower light shielding metal films).

Figure 3:
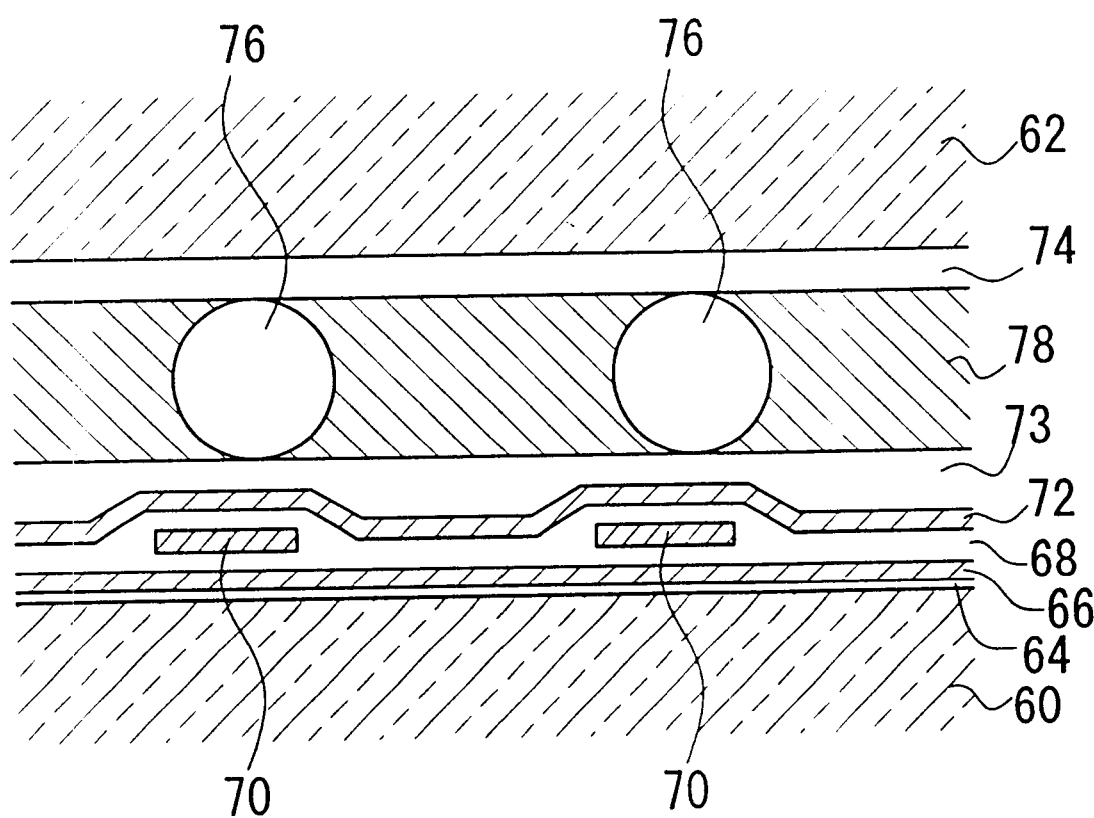
FIG. 3 shows a sectional view showing a sectional structure of a sealing region of a portion of a data line covered with the metal layer of FIG. 2, which is cut in a direction orthogonal to the data line.

Next, reference is made to FIG. 3, showing a sectional structure of the sealing region of the data line of a portion covered with the metal layer 50 of FIG. 2, which is cut in a direction orthogonal to the data line. In the drawing, reference numeral 60 denotes a thin-film transistor substrate. On the thin-film transistor 60, an undercoating film 64 is formed, the metal layer used as the lower light shielding metal film and having a metal different from the data line is extended to the sealing region thereon, and thus a lower shielding metal film 66 is formed. In an interlayer insulating film 68 deposited on the lower shielding metal film 66, data lines 70 are formed at regular intervals. Since the lower shielding metal film 66 is placed under a high-temperature environment in the process of manufacturing the thin-film transistor, a high-temperature resistant material, such as tungsten silicide (WSi), is used. The upper and lower shielding metal films 72 and 66 in FIG. 3 are equivalent to the metal layer 50 in FIG. 2.

Over the data lines 70, a metal layer used as an upper light shielding metal film and having a metal different from each of the data lines 70 is extended to the sealing region, and an upper shielding metal film 72 is formed to surround the data lines 70. Further, an insulating film 73 is deposited on the upper shielding metal film 72. The data lines 70 and the upper shielding metal film 72 (although not both) are made of, for instance, aluminum.

On the other hand, an insulating film 74 is formed as an undercoating film on the surface of the opposed glass substrate 62. The thin-film transistor substrate 60 and the opposed glass substrate 62 are laminated by interposing a sealing material 78 and spacers 76 used to control the size of a gap to be filled with liquid crystals. The upper shielding metal film 72 is held at a constant potential so as to prevent the application of unnecessary electrical fields to the liquid crystal layer of a pixel adjacent to the upper light shielding metal film. The floating state of the lower light shielding metal film leads to its function as a gate for the thin-film transistor. To prevent such a state, the lower shielding metal film 66 is held at a constant potential. The upper and lower shielding metal films 72 and 66 are simultaneously formed by performing patterning when the upper and lower light shielding metal films are respectively formed.

With the active matrix liquid crystal display device of the first embodiment of the present invention, since most of the longitudinal portions of all the data lines formed between the data driver circuit and the pixel matrix are covered so as to be surrounded by the metal layer having a metal different from that of the data line formed for a purpose other than shielding, electrostatic coupling capacitance between the data lines can be reduced without providing any new metal layers for shielding. Accordingly, it is possible to reduce noise generated following voltage fluctuation between the data lines, and to improve image quality.

Moreover, since it is not necessary to provide any new metal layers for shielding, it is not necessary to increase the number of manufacturing steps and it is possible to prevent the device structure from becoming complex.

Figure 4:
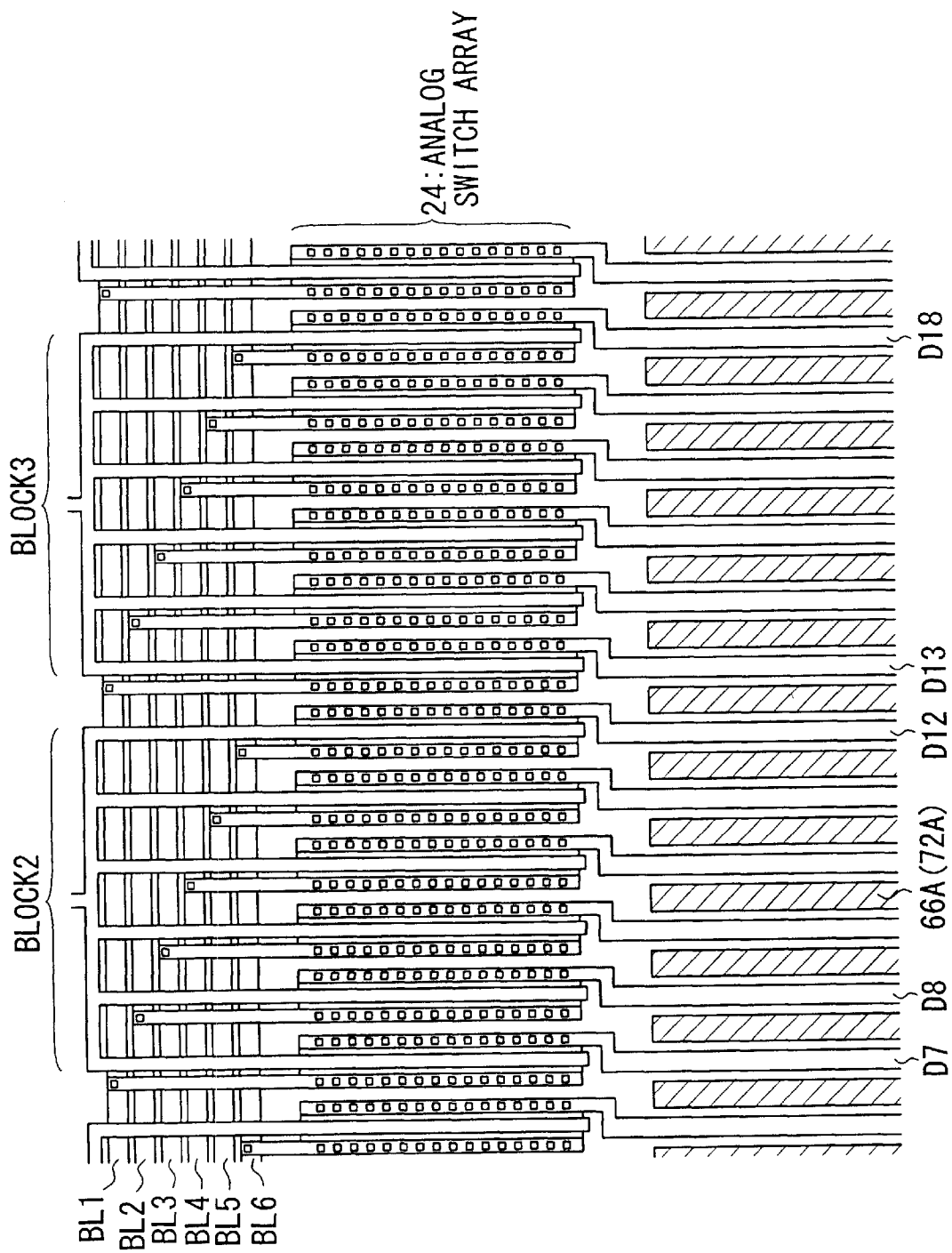
FIG. 4 shows a layout view showing a shielding structure of a data line in an active matrix liquid crystal display device according to a second embodiment of the present invention.

Next, a description will be made of an active matrix liquid crystal display device according to a second embodiment of the present invention. Except for the shielding structure of the data lines, the circuitry of the active matrix liquid crystal display device of this embodiment is similar to that shown in FIG. 2, and thus description of similar portions will be omitted. Portions of the circuitry will be described by referring to FIG. 1 when necessary. FIG. 4 is a layout view showing wiring from the analog switch array 24 of the data driver circuit 20 to the pixel matrix 1.

FIG. 4 shows a shielding structure of the second embodiment of the present invention regarding the portions of the blocks 2 and 3 of the data lines in FIG. 1. In the drawing, a center portion indicates an analog switch array 24 of the data driver circuit 20. In this portion, switch transistors Q7 to Q12 and Q13 to Q18 are formed to perform block-at-a-time addressing for the data lines D7 to D12 (Block2) and D13 to D18 (Block3).

The data lines D7 to D18 are shielded by extending metal layers 66A and 72A different from the data lines and formed for a purpose other than shielding to the sealing region so as to prevent overlapping with the data lines.

Figure 5:
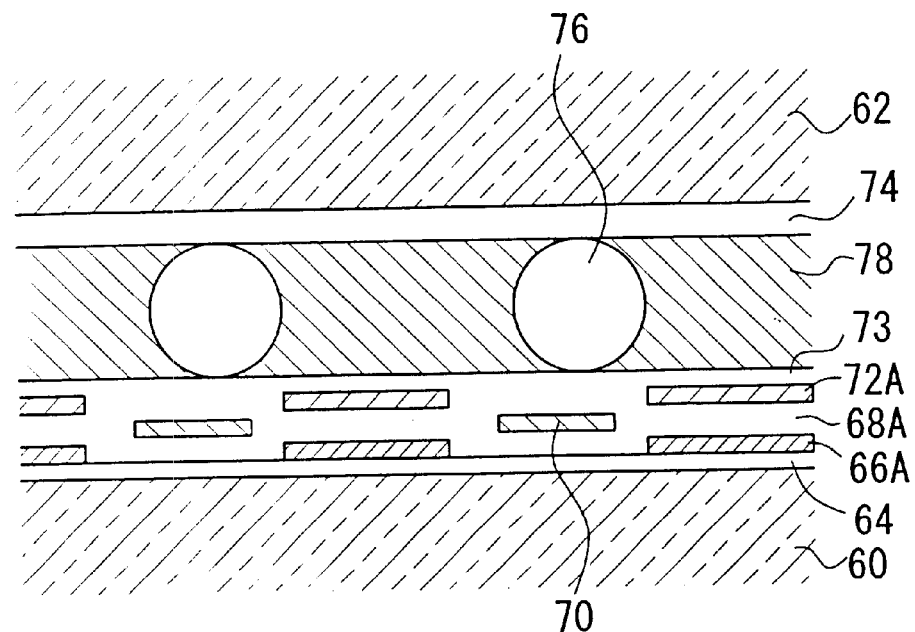
FIG. 5 shows a sectional view showing a sectional structure of a sealing region of a portion of a data line shielded by the metal layer of FIG. 4, which is cut in a direction orthogonal to the data line.

FIG. 5 shows a sectional structure of the sealing region of portions of data lines shielded by the metal layers 66A and 72A in FIG. 4, which is cut in a direction orthogonal to the data line. In the drawing, reference numeral 60 denotes a thin-film transistor substrate. An undercoating film 64 is formed on the thin-film transistor substrate 60, and a metal layer used as a lower light shielding film and having a metal different from that of the data line is extended to the sealing region so as not to overlap the data line thereon. Then, a lower shielding metal film 66A is formed.

In an interlayer insulating film 68A deposited on the lower shielding metal film 66A, data lines 70 are formed at regular intervals. For the lower shielding metal film 66A, as in the case of the first embodiment, a high-temperature resistant material, such as tungsten suicide (WSi), is used.

Over the data lines 70, a metal layer used as an upper light shielding metal film and having a metal different from that of the data line 70 is extended to the sealing region so as not to overlap the data lines 70, and then an upper shielding metal film 72A is formed. Further, an insulating film 73 is deposited on the upper shielding metal film 72A. The data lines 70 and the upper shielding metal film 72A (but not both) are made of, for instance, aluminum. The upper and lower shielding metal films 72A and 66A are simultaneously formed by performing patterning when the upper and lower light shielding metal films are respectively formed.

On the other hand, on the surface of the opposed glass substrate 62, an insulating film 74 is formed as an undercoating film. The thin-film transistor substrate 60 and the opposed glass substrate 62 are laminated by interposing a sealing material 78 and spacers 76 used to control the size of a gap filled with liquid crystals. For the same reasons as those in the first embodiment, the upper and lower shielding metal films 72A and 66A are held respectively at constant potentials.

In the active matrix liquid crystal display device according to the second embodiment of the present invention, since between the data lines formed between the data driver circuit and the pixel matrix, the shield wiring by the metal layers having a metal different from that of the data lines and formed for the purpose other than shielding is provided in such a manner that overlapping with the data lines is prevented, electrostatic coupling capacitance between the data lines can be reduced without providing any new metal layers for shielding. Accordingly, it is possible to reduce noise generated following voltage fluctuation between the data lines, and to improve image quality.

Moreover, since it is not necessary to provide any new metal layers for shielding, it is not necessary to increase the number of manufacturing steps and it is possible to prevent the device structure from becoming complex.

Next, description will be made for an active matrix liquid crystal display device according to a third embodiment of the present invention. Except the shielding structure of the data lines, the circuitry of the active matrix liquid crystal display device of this embodiment is the same as that shown in FIG. 1, and thus description of similar portions will be omitted. Description of the layout of wiring from the analog switch array 24 of the data driver circuit 20 to the pixel matrix will also be omitted, as it is similar to that shown in FIG. 4.

Figure 6:
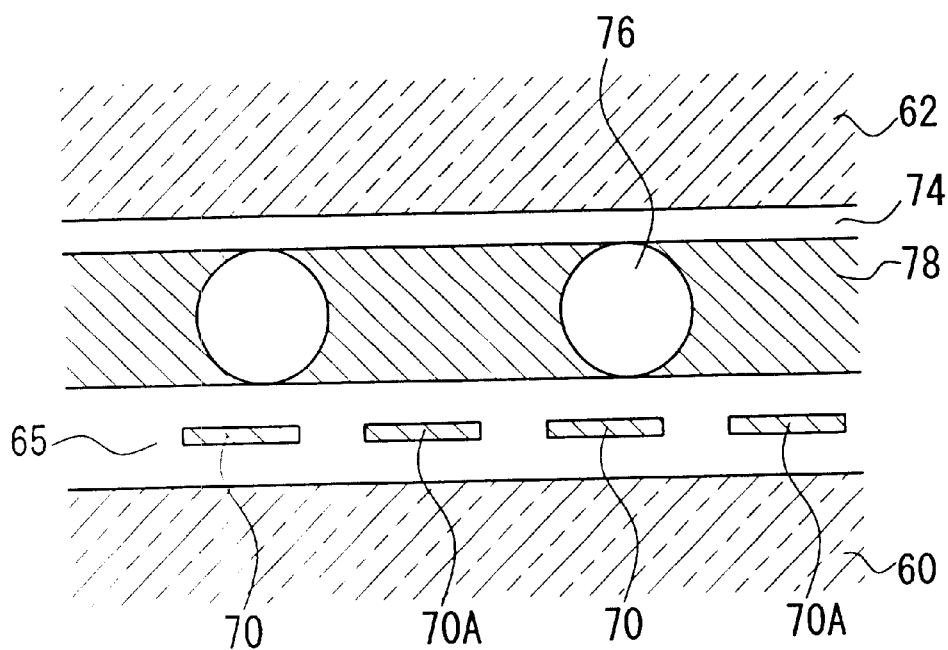
FIG. 6 shows a sectional view showing a sectional structure of a sealing region cut in a direction orthogonal to a data line in an active matrix liquid crystal display device according to a third embodiment of the present invention.

FIG. 6 shows a shielding structure of data lines of the active matrix liquid crystal display device of the third embodiment, i.e., a sectional structure of the sealing region cut in a direction orthogonal to the data line. In this case, as can be understood from FIG. 6, unlike the shielding structure of the data lines of FIG. 5, shield wiring 70A by the metal layer having the same metal as that of the data lines 70 is provided between the data lines 70 so as not to overlap therewith. Elements like those shown in FIG. 5 are denoted by like reference numerals, and duplicated descriptions will be omitted. In FIG. 6, reference numeral 65 denotes an insulating layer, and the shield wiring 70A is held at a constant potential. The shield wiring 70A is formed simultaneously with the data lines 70 by performing patterning when the data lines 70 are formed.

In the active matrix liquid crystal display device according to the third embodiment of the present invention, since between the data lines formed between the data driver circuit and the pixel matrix, the shield wiring by the metal layer having the same metal as that of the data lines is provided so as not to overlap with the data lines, electrostatic coupling capacitance between the data lines can be reduced without providing any new metal layers. Accordingly, it is possible to reduce noise generated following voltage fluctuation between the data lines, and to improve image quality.

Moreover, since it is not necessary to provide any new metal layers for shielding, it is not necessary to increase the number of manufacturing steps, and it is possible to prevent the device structure from becoming complex.

Figure 7:
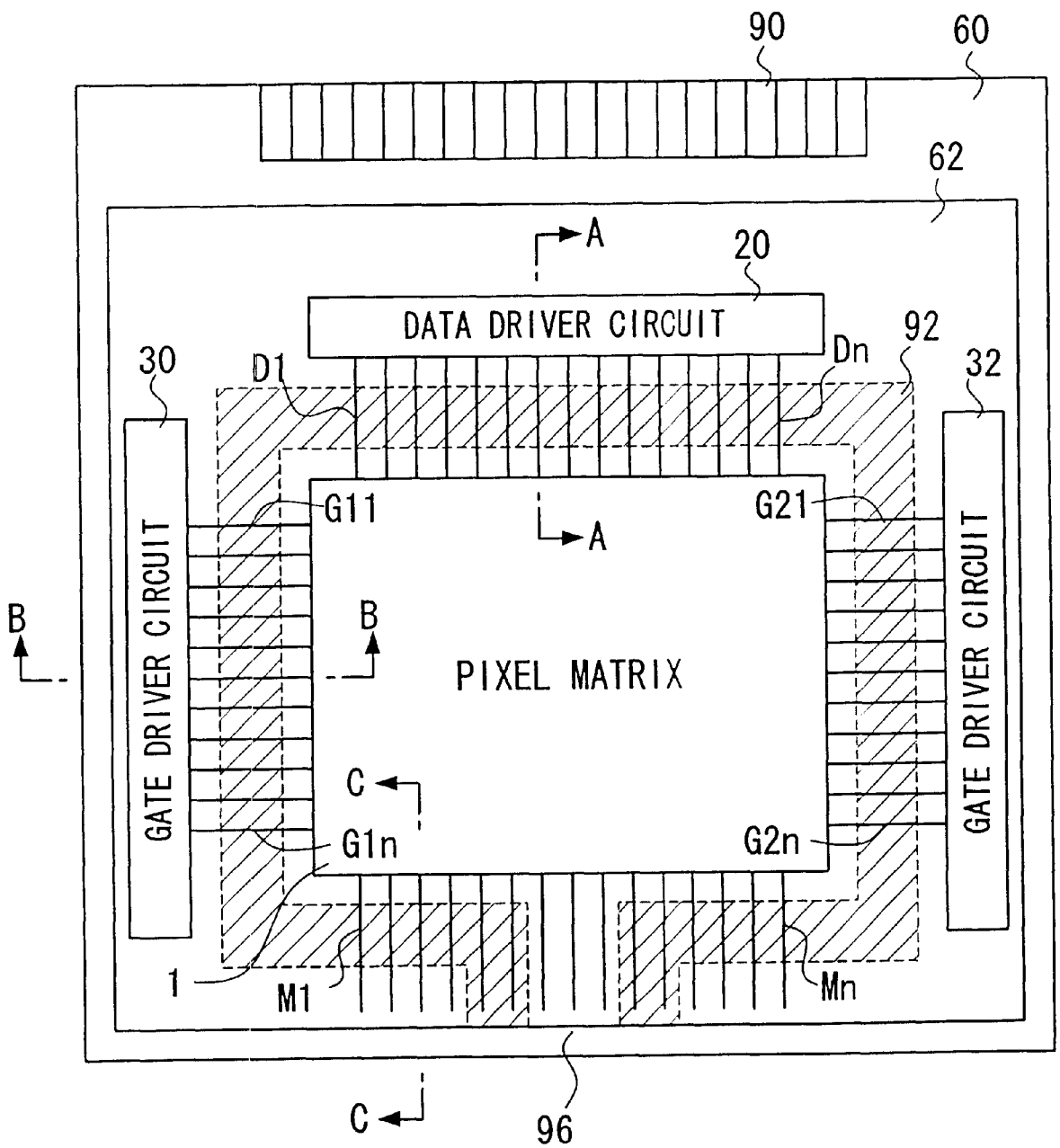
FIG. 7 shows a plan view showing a wiring structure of an active matrix liquid crystal display device according to a fourth embodiment of the present invention.
Figure 9:
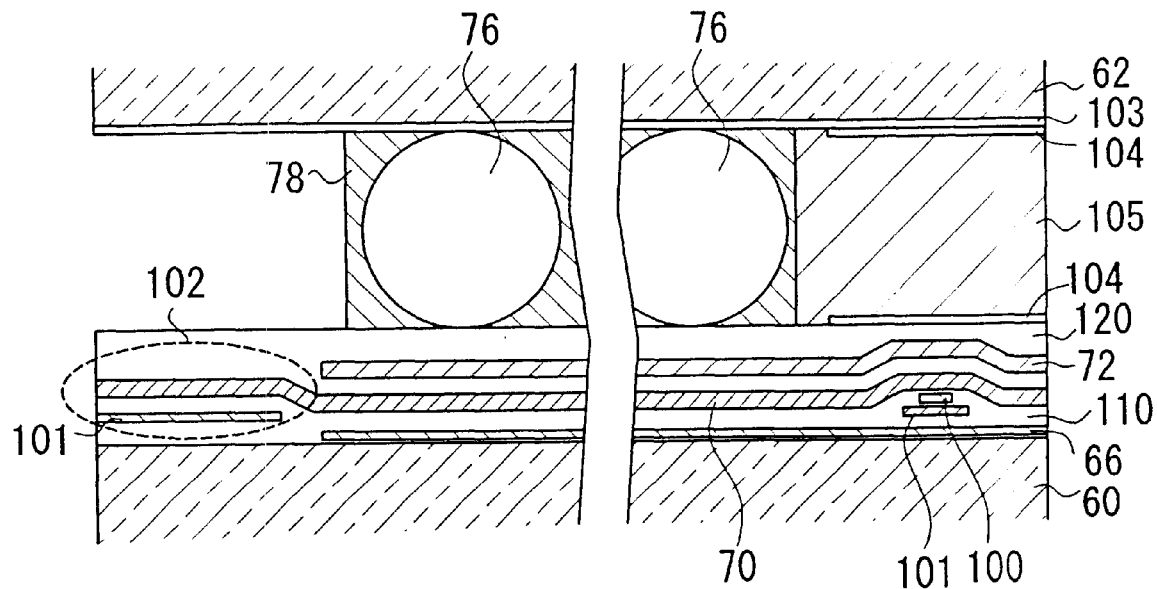
FIG. 9 shows a sectional view taken on cutting-plane line A—A of FIG. 7.
Figure 10:
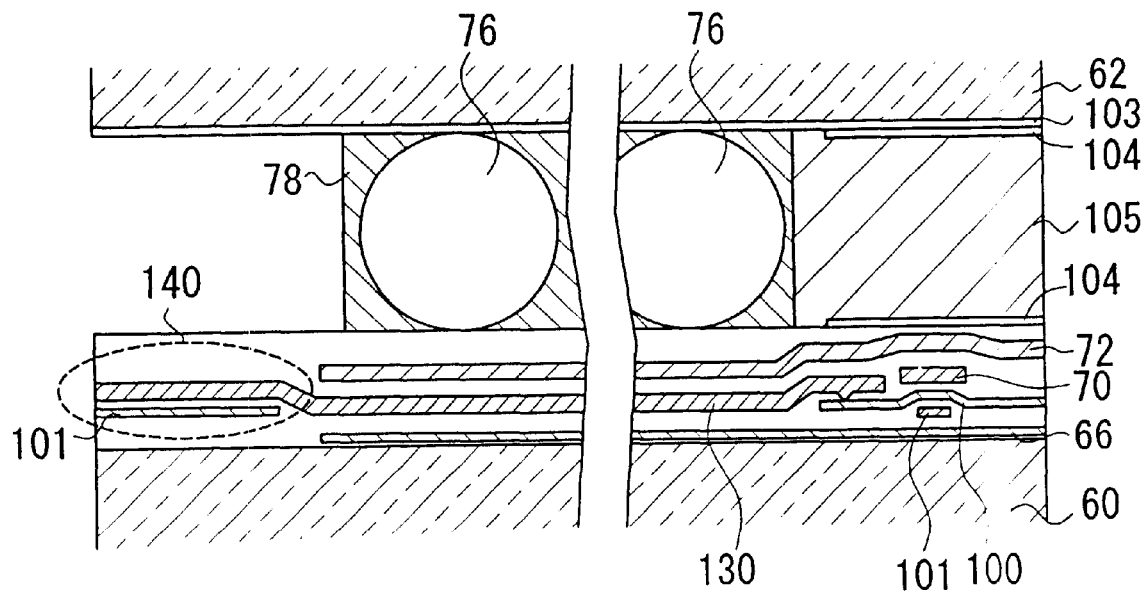
FIG. 10 shows a sectional view taken on cutting-plane line B—B of FIG. 7
Figure 11:
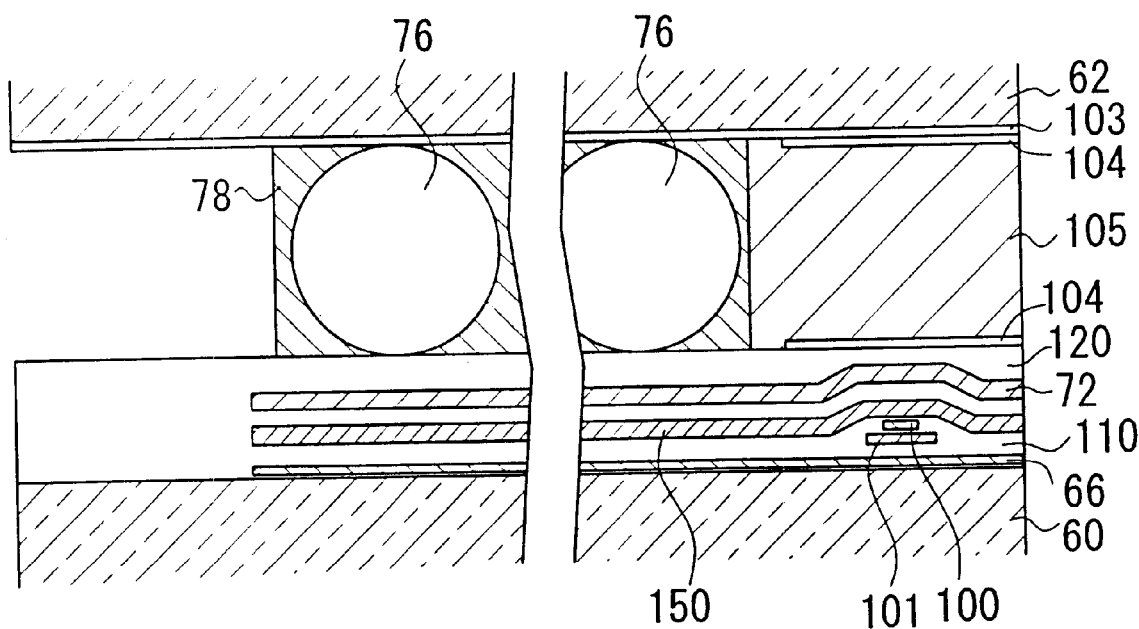
FIG. 11 shows a sectional view taken on cutting-plane line C—C of FIG. 7
Figure 12:
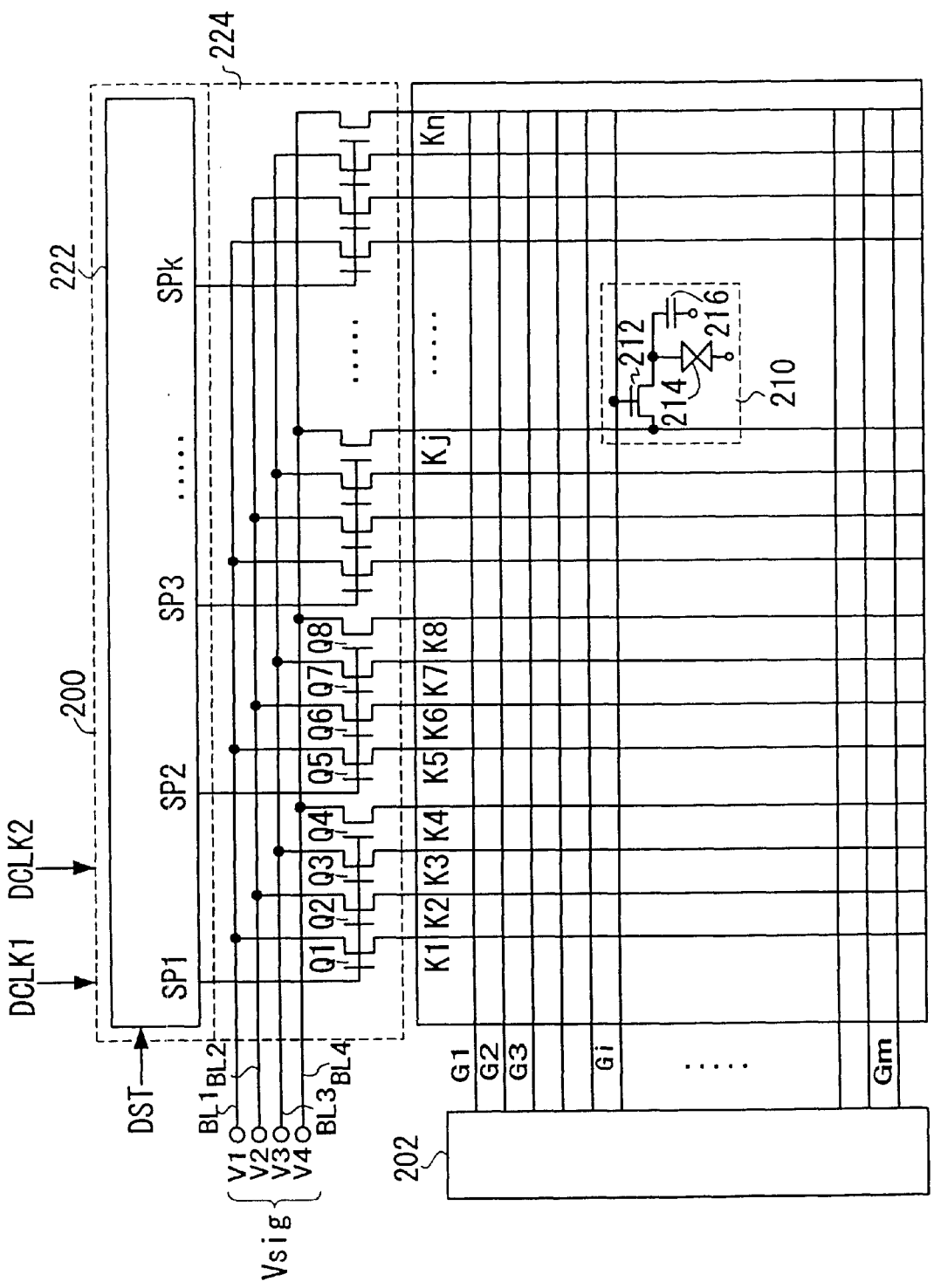
FIG. 12 shows a circuit diagram showing an example of circuitry of a conventional active matrix liquid crystal display device.
Figure 13:
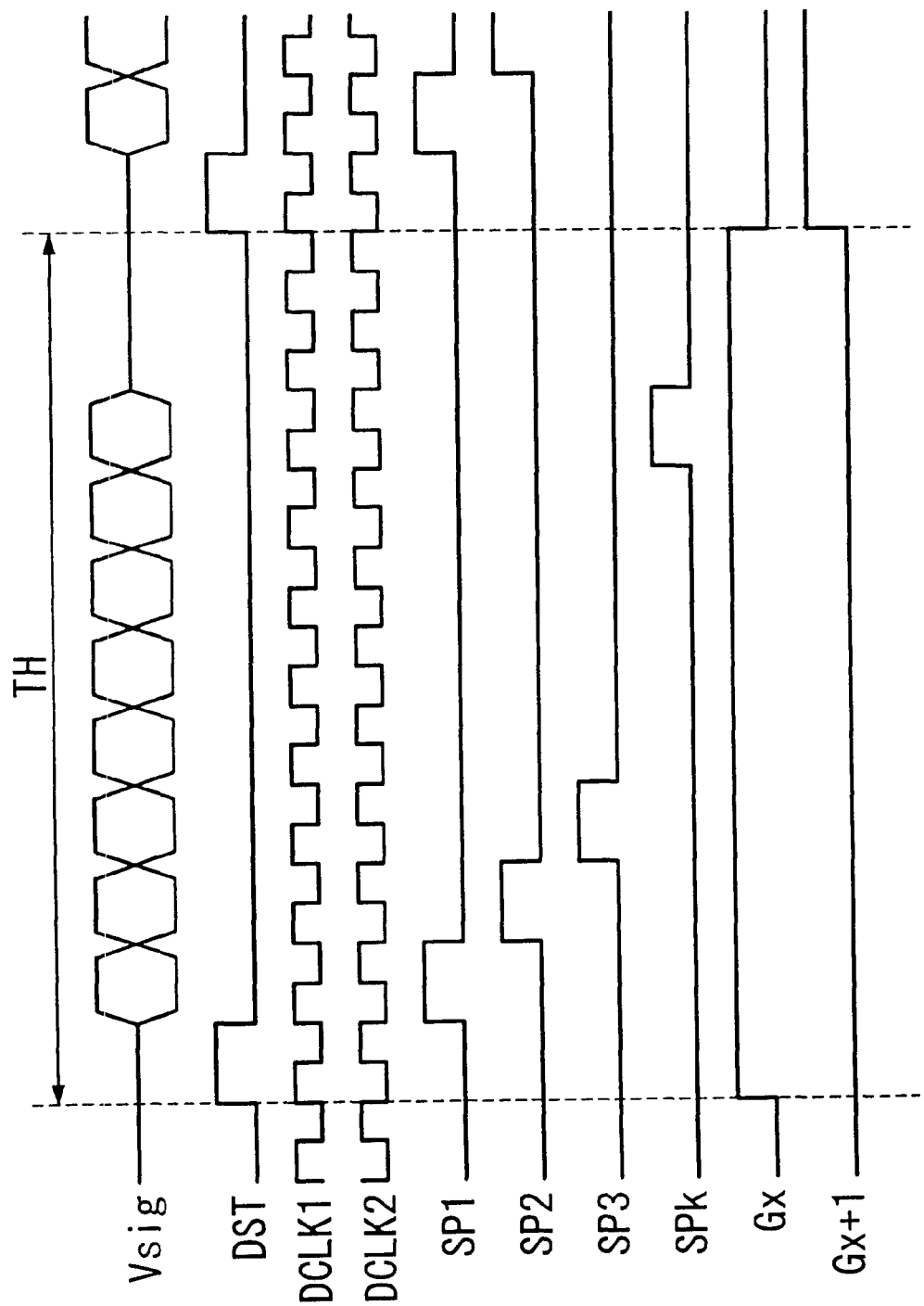
FIG. 13 shows a timing chart showing an operation during block-at-a-time addressing of the conventional active matrix liquid crystal display device shown in FIG. 12.
Figure 14:
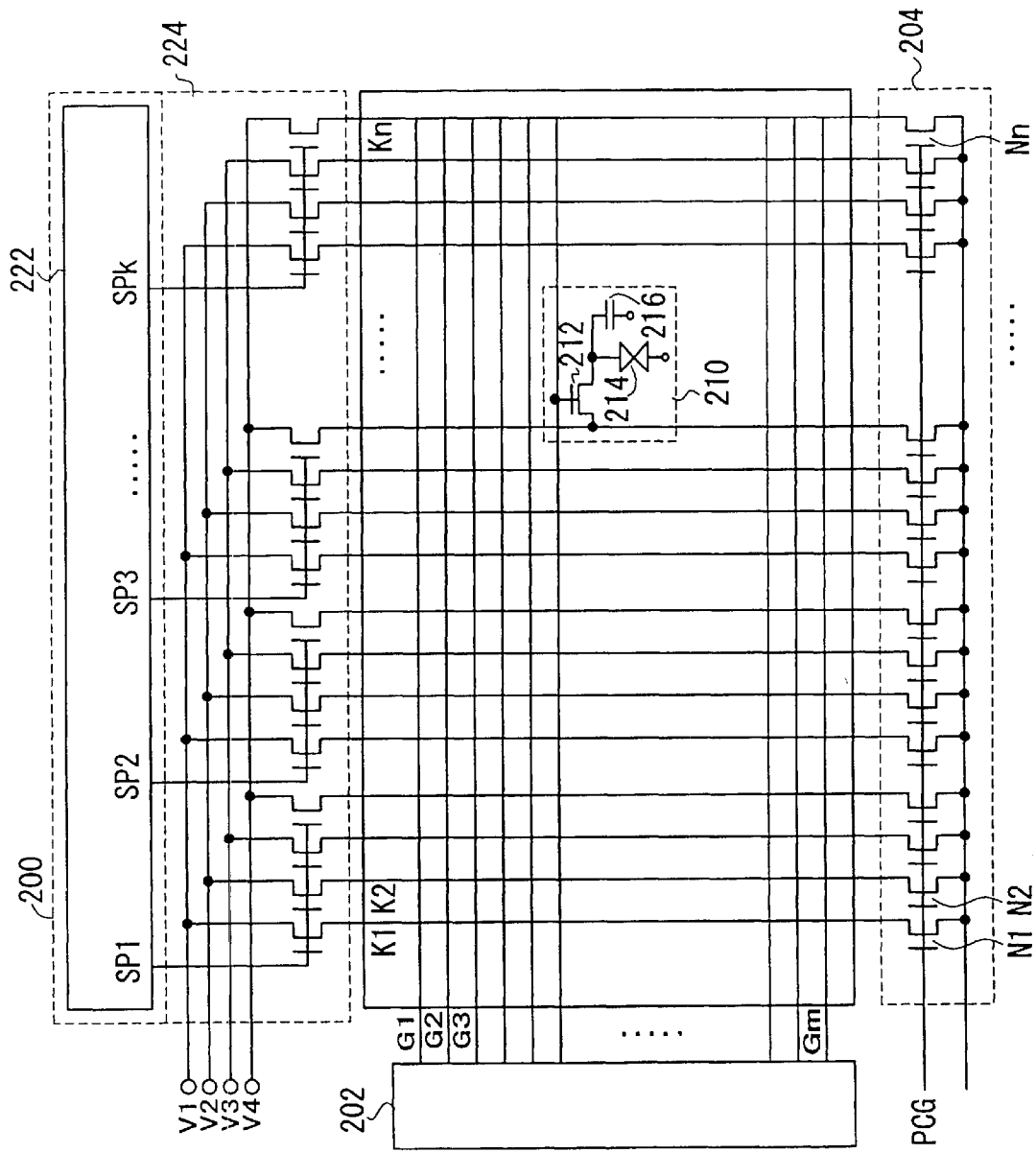
FIG. 14 shows a circuit diagram showing the configuration of a conventional example of an active matrix liquid crystal display device, which includes a precharge circuit provided in a side opposite to a data driver circuit sandwiching a pixel matrix.
Figure 15:
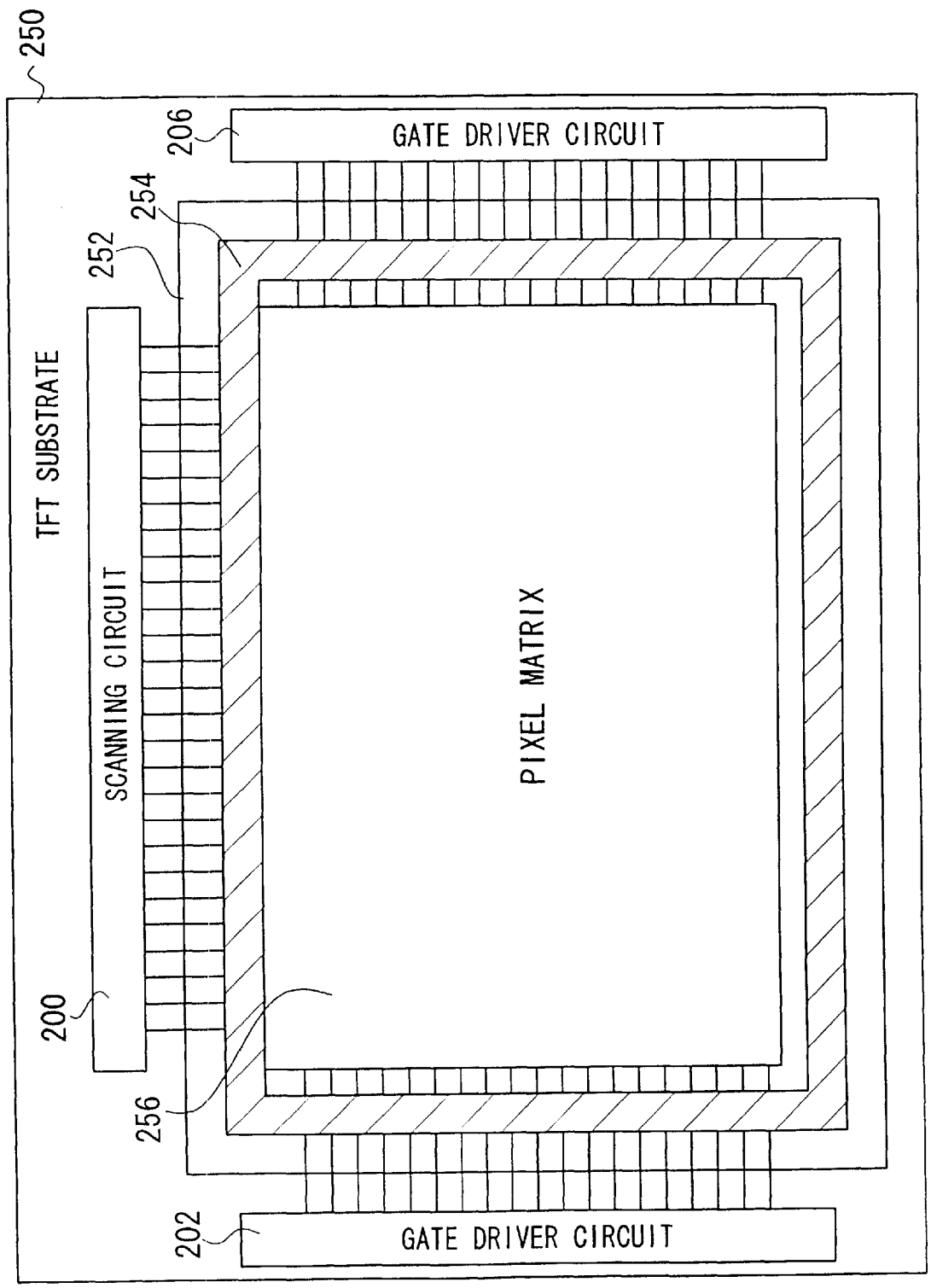
FIG. 15 shows a view schematically illustrating the structure of the conventional active matrix liquid crystal display device.
Figure 16:
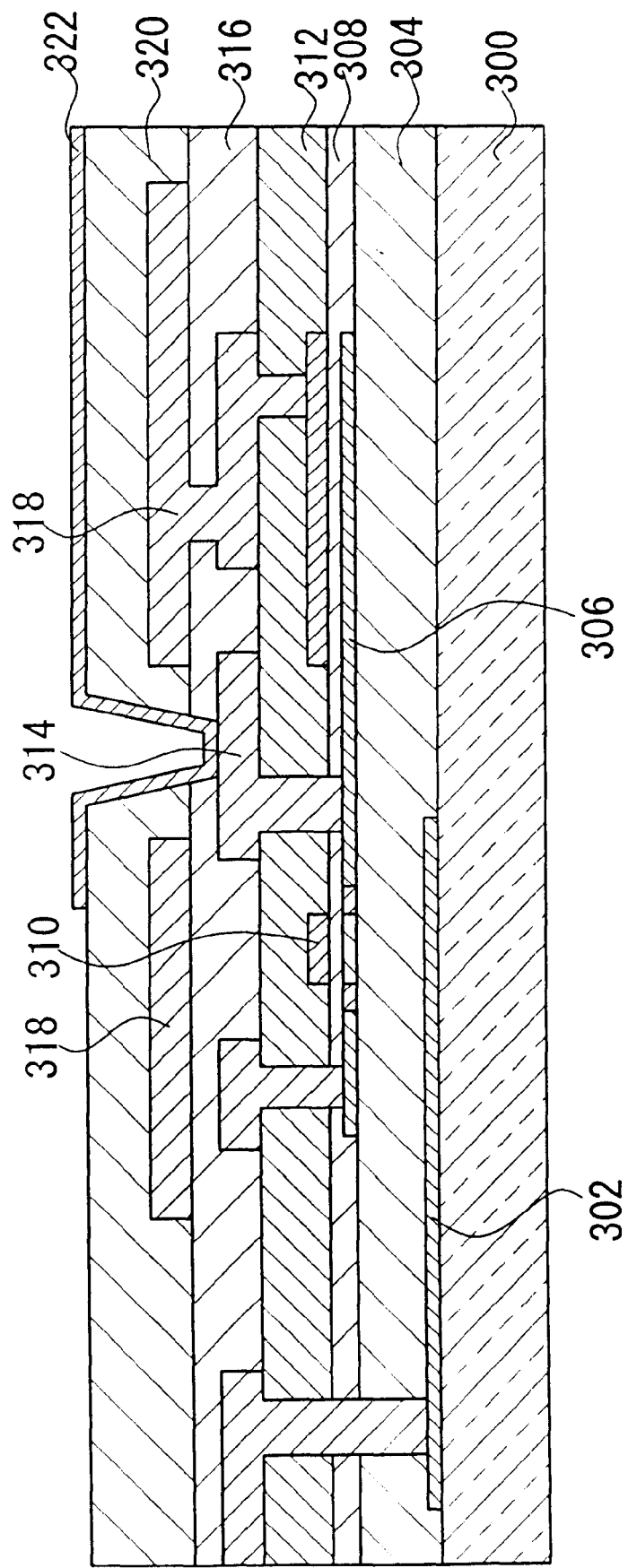
FIG. 16 shows a sectional view showing the device structure of an active matrix liquid crystal display device for a projector, to which the present invention is applied.

Next, a description will be made of an active matrix liquid crystal display device according to a fourth embodiment of the present invention. A circuitry of the active matrix liquid crystal display device of the embodiment is basically the same as that of the first embodiment shown in FIG. 1, and thus description thereof will be omitted. FIG. 7 is a plan view showing a wiring structure of the active matrix liquid crystal display device of the embodiment; and FIGS. 9 to 11 are sectional views showing respective portions of FIG. 7. Specifically, FIG. 9 is a sectional view taken on line A—A of FIG. 7; FIG. 10, a sectional view taken on line B—B of FIG. 7; and FIG. 11, a sectional view taken on line C—C of FIG. 7.

The active matrix liquid crystal display device of the fourth embodiment is different in wiring structure from the other embodiments in that the shielding structure of gate lines G11 to G1n and G21 to G2n is the same as that of the data lines D1 to Dn as shown in FIG. 7, and in that in a side opposite to the data driver circuit 20 with respect to the pixel matrix 1, pseudo-wiring M1 to Mn of a shielding structure identical to that of the data lines are provided toward the peripheral edge side of the thin-film transistor substrate 60 (opposed glass substrate 62) from the pixel matrix 1. In FIG. 7, reference numeral 92 denotes a sealing region formed when the thin-film transistor substrate 60 and the opposed glass substrate 62 are laminated; numeral 90, a connection pad; and numeral 96, a liquid crystal injection port.

As shown in FIG. 9, the shielding structure from the data driver circuit 20 to the pixel matrix 1 is the same as that of the active matrix liquid crystal display device of the first embodiment described above with reference to FIGS. 2 and 3. In other words, most of the longitudinal portions of the entire data lines are formed so as to be surrounded by the upper and lower shielding metal films 72 and 66.

FIG. 9 shows the shielding structure of the data lines in a vertical cross section. In the drawing, by using the sealing material 78, the thin-film transistor substrate 60 and the opposed glass substrate 62 are laminated by interposing the data line 70 and the spacers 76 so as to maintain a constant gap. This gap is filled with liquid crystals to form a liquid crystal layer 105. Reference numeral 104 denotes a transparent electrode, which is made of, for instance, an ITO film; numeral 103, an undercoating film; and numerals 110 and 120, insulating layers.

On the thin-film transistor substrate 60, the upper and lower shielding films 72 and 66 are formed by extending the upper and lower light shielding metal layers sandwiching the data line 70 respectively to the sealing region so as to surround the data line 70. Reference numeral 100 denotes a gate metal film and numeral 101 denotes a polysilicon metal film. Drain and source regions are formed by means of impurity injection in the polysilicon film 101 formed directly under the gate metal film 100, and then a pixel thin-film transistor is formed. The pixel thin-film transistor and a switch transistor 102 constituting the analog switch array are manufactured in the same process, as the pixel thin-film transistor is formed by using a polysilicon film.

On the thin-film transistor substrate 60, portions other than the metal film, the metal layer, and the polysilicon film are insulating layers, and detailed description thereof will be omitted for convenience.

In the active matrix liquid crystal display device of the embodiment, as shown in FIG. 10, the shielding structure of the gate lines (G11 to G1n, and G21 to G2n) is the same as that of the data lines (D1 to Dn). In FIG. 10, the gate line is denoted by reference numeral 130. In the drawing, the gate line 130 connected to the gate metal film 100 is held between upper and lower light shielding metal layers. The upper and lower light shielding metal layers 72 and 66 are formed by extending the upper and lower light shielding metal layers sandwiching the gate line 130 respectively to the sealing region so as to surround the gate line 130. Reference numeral 140 denotes a buffer gate provided in the gate driver circuit 30. Other constitutional elements are similar to those shown in FIG. 9.

FIG. 11 shows a shielding structure of the pseudo-wiring of FIG. 7 in a vertical cross section. In the drawing, the pseudo-wiring is denoted by reference numeral 150. Since the shielding structure is the same as that shown in FIG. 9, like elements are denoted by like reference numerals, and description thereof will be omitted.

With the active matrix liquid crystal display device of the embodiment of the present invention, since the shielding structure of the gate lines formed between the gate driver circuit and the pixel matrix is the same as that of the data lines, the sealing region can be uniformly pressurized when the substrate having the pixel transistor formed thereon and the opposed substrate are laminated, and the gap to be filled with liquid crystals can be set uniform.

Moreover, with the active matrix liquid crystal display device of the embodiment of the present invention, since the shielding structure of the gate lines formed between the gate driver circuit and the pixel matrix is the same as that of the data lines, and in the side opposite to the data driver circuit with respect to the pixel matrix, the pseudo-wiring of the same shielding structure as that of the data lines is extended to the peripheral edge side of the substrate from the pixel matrix, it is possible to more uniformly pressurize the sealing region when the substrate having the pixel transistor formed thereon and the opposed substrate thereof are laminated, and to keep uniform the gap to be filled with liquid crystals.

In the embodiment, the shielding structures of the data lines, the gate lines, and the pseudo-wiring are the same as that of the data lines of the first embodiment. However, these shielding structures may be formed so as to be similar to those of the second and third embodiments.

Figure 8:
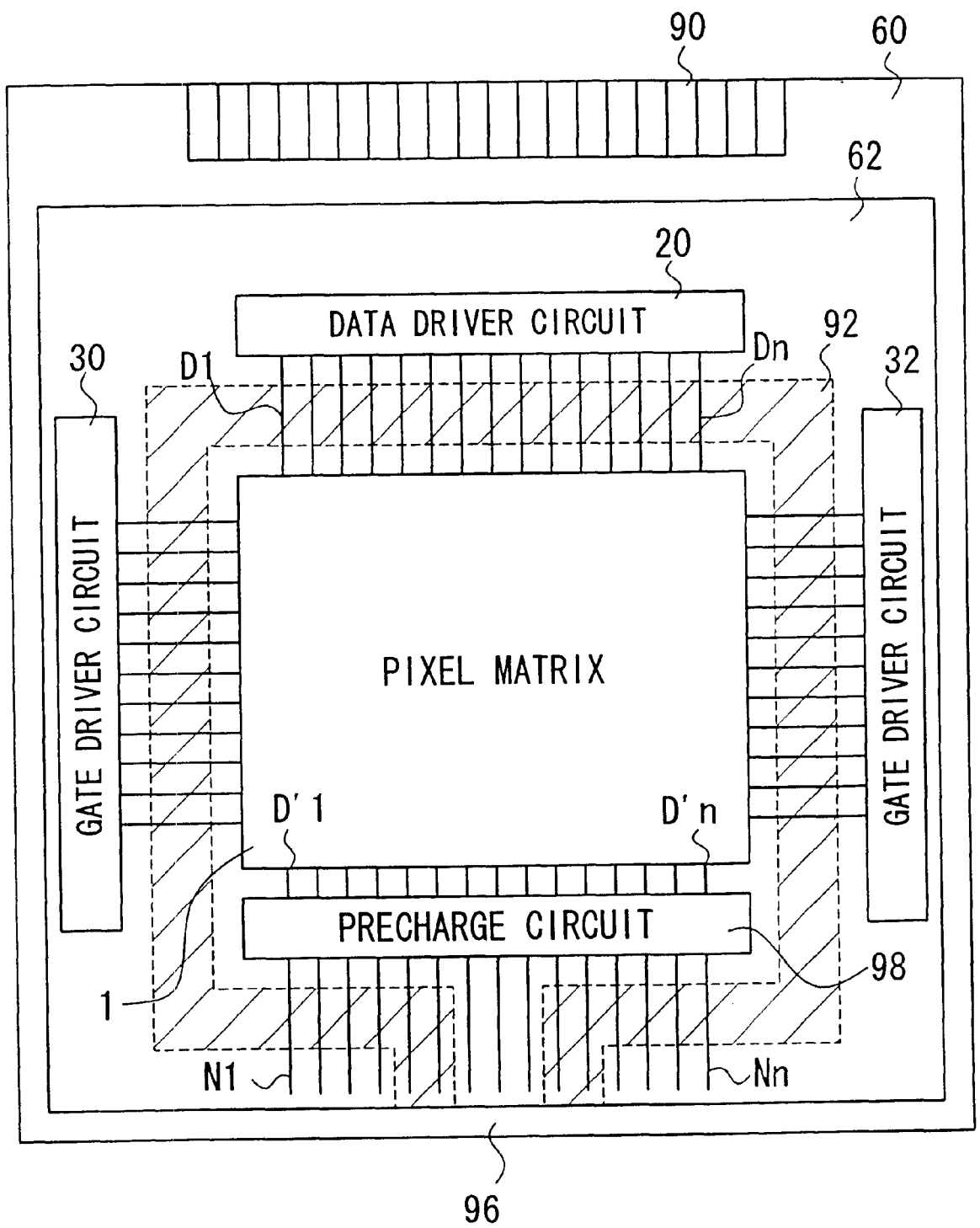
FIG. 8 shows a plan view showing a wiring structure of an active matrix liquid crystal display device according to a fifth embodiment of the present invention.

Next, a description will be made for an active matrix liquid crystal display device according to a fifth embodiment of the present invention. A circuitry of the active matrix liquid crystal display device of this embodiment is basically the same as that of the first embodiment shown in FIG. 1, and thus description thereof will be omitted. FIG. 8 is a plan view showing a wiring structure of the active matrix liquid crystal display device of the embodiment. The active matrix liquid crystal display device comprises: a pixel matrix 1 composed of pixels that have pixel transistor, liquid crystal capacitance and storage capacitance, wherein these capacitances are connected to data lines through the pixel transistors, which are disposed at respective intersections between data lines D1 to Dn and gate lines G11 to G1n and G21 to G2n arranged longitudinally and latitudinally, respectively; a data driver circuit 20 for driving the data lines D1 to Dn; gate driver circuits 30 and 32 for driving the gate lines G11 to G1n and G21 to G2n; and a precharge circuit 98 for precharging the data lines D1 to Dn. These elements are all manufactured on the same substrate 60. The data driver circuit 20 and the gate driver circuit 30 are formed outside a sealing region 92, which is located outside the pixel matrix 1.

In the active matrix liquid crystal display device of the fifth embodiment, shielding structures are all formed to be identical among the data lines D1 to Dn formed between the data driver circuit 20 and the pixel matrix 1, data lines D1 to]Dn formed between the precharge circuit 98 and the pixel matrix 1, pseudo-wiring M1 to Mn formed by the metal layer having the same metal as that of the data lines D1 to Dn disposed from the precharge circuit 98 toward the peripheral edge portion of the substrate 60, and the gate lines G11 to G1n and G21 to G2n formed between the gate driver circuits 30 and 32 and the pixel matrix 1.

By forming the shielding structures of the data lines D1 to Dn and other wiring so as to be the same as those of the active matrix liquid crystal display device of the first to third embodiments, the same effect as that of the active matrix liquid crystal display device of the first to third embodiments can be obtained.

The active matrix liquid crystal display device of the fifth embodiment comprises: the pixel matrix composed of the pixel transistors and the pixels connected to the data lines through these pixel transistors, which are disposed at the respective intersections between the data lines and the gate lines arranged longitudinally and latitudinally, respectively; the data driver circuit for driving the data lines; the gate driver circuits for driving the gate lines; and the precharge circuit for precharging the data lines. The above elements are manufactured on the same substrate, and the data driver circuit and the gate driver circuits are formed outside the sealing region located outside the pixel matrix. In this case, the shielding structures are all identical among the data lines D1 to Dn formed between the data driver circuit 20 and the pixel matrix 1, the data lines D1 to Dn formed between the precharge circuit 98 and the pixel matrix 1, the pseudo-wiring M1 to Mn formed by the metal layer having the same metal as that of the data lines D1 to Dn disposed from the precharge circuit 98 toward the peripheral edge portion of the substrate 60, and the gate lines G11 to G1n and G21 to G2n formed between the gate driver circuits 30 and 32 and the pixel matrix 1. Thus, it is possible to uniformly pressurize the sealing region when the substrate having the pixel transistor formed thereon and the opposed substrate thereof are laminated, and to keep uniform a gap to be filled with liquid crystals.

Although the preferred embodiments of the present invention have been described in detail, it should be understood that various changes, substitutions and alternations can be made therein without departing from spirit and scope of the inventions as defined by the appended claims.

What is claimed is:

1. An active matrix liquid crystal display device comprising:

a pixel matrix composed of pixels that have pixel transistors, liquid crystal capacitance and storage capacitance, wherein said liquid crystal capacitance and said storage capacitance are connected to data lines through the pixel transistors, wherein each pixel is disposed at respective intersections between the data lines and gate lines arranged longitudinally and latitudinally, respectively;

a data driver circuit for driving the data lines; and gate driver circuits for driving the gate lines, wherein said pixel matrix, said data driver circuit and said gate driver circuits are all manufactured on the same substrate, said data driver circuit and said gate driver circuits are formed outside a sealing region located outside said pixel matrix, and all the data lines formed between said data driver circuit and said pixel matrix are substantially covered by at least one metal layer which is composed of a different metal from that of the data lines;

wherein said metal layer is adapted to perform both light shielding and reduction of electrostatic coupling capacitance between said data lines.

2. An active matrix liquid crystal display device according to claim 1, further comprising a shielding structure of said gate lines formed between said gate driver circuits and said pixel matrix, said shielding structure comprising a metal layer formed so as to substantially the same as that for said data lines.

3. An active matrix liquid crystal display device according to claim 2, further comprising, in a side opposite to said data driver circuit of said pixel matrix, pseudo-wiring; and a shielding structure for said pseudo-wiring; said shielding structure comprising a metal layer formed so as to be substantially the same as that for said data lines and provided to be extended from the pixel matrix toward a peripheral edge side of said substrate.

4. An active matrix liquid crystal display device according to claim 1, wherein said metal layer is a light shielding metal film provided to light shield a pixel thin-film transistor.

5. An active matrix liquid crystal display device comprising:

a pixel matrix composed of pixels that have pixel transistors, liquid crystal capacitance and storage capacitance, wherein said liquid crystal capacitance and said storage capacitance are connected to data lines through the pixel transistors, wherein each pixel is disposed at respective intersections between the data lines and gate lines arranged longitudinally and latitudinally, respectively;

a data driver circuit for driving the data lines; and gate driver circuits for driving the gate lines, wherein said pixel matrix, said data driver circuit and said gate driver circuits are all manufactured on the same substrate, said data driver circuit and said gate driver circuits are formed outside a sealing region located outside said pixel matrix, and between the data lines formed between said data driver circuit and said pixel matrix, further comprising at least one metal layer composed of a different metal from that of the data lines, wherein said metal layer is adapted to perform both light shielding and reduction of electrostatic coupling capacitance between said data lines;

wherein no part of said metal layer is disposed directly above or below any of said data lines.

6. An active matrix liquid crystal display device according to claim 5, further comprising a shielding structure of said gate lines formed between said gate driver circuits and said pixel matrix, said shielding structure comprising a metal layer formed so as to be substantially the same as that for said data lines.

7. An active matrix liquid crystal display device according to claim 6, further comprising, in a side opposite to said data driver circuit of said pixel matrix, pseudo-wiring; and a shielding structure for said pseudo-wiring; said shielding structure comprising a metal layer formed so as to be substantially the same as that of said data lines and provided to be extended from the pixel matrix toward a peripheral edge side of said substrate.

8. An active matrix liquid crystal display device according to claim 5, wherein said metal layer is a light shielding metal film provided to light shield a pixel thin-film transistor.

9. An active matrix liquid crystal display device comprising:

a pixel matrix composed of pixels that have pixel transistors, liquid crystal capacitance and storage capacitance, wherein said liquid crystal capacitance and said storage capacitance are connected to data lines through the pixel transistors, wherein each pixel is disposed at respective intersections between the data lines and gate lines arranged longitudinally and latitudinally, respectively;

a data driver circuit for driving the data lines; and gate driver circuits for driving the gate lines, wherein said pixel matrix, said data driver circuit and said gate driver circuits are all manufactured on the same substrate, said data driver circuit and said gate driver circuits are formed outside a sealing region located outside said pixel matrix, and between the data lines formed between said data driver circuit and said pixel matrix, a metal layer composed of the same metal as that of the data lines is provided;

wherein said metal layer is adapted to perform both light shielding and reduction of electrostatic coupling capacitance between said data lines; and wherein no part of said metal layer is disposed directly above or below any of said data lines.

10. An active matrix liquid crystal display device according to claim 9, further comprising a shielding structure of said gate lines formed between said gate driver circuits and said pixel matrix, said shielding structure comprising a metal layer formed so as to be substantially the same as that for said data lines.

11. An active matrix liquid crystal display device according to claim 10, further comprising, in a side opposite to said data driver circuit for said pixel matrix, pseudo-wiring; and a shielding structure for said pseudo-wiring; said shielding structure comprising a metal layer formed so as to be substantially the same as that for said data lines and provided to be extended from the pixel matrix toward a peripheral edge side of said substrate.

12. An active matrix liquid crystal display device comprising:

a pixel matrix composed of pixels that have pixel transistors, liquid crystal capacitance and storage capacitance, wherein said liquid crystal capacitance and said storage capacitance are connected to data lines through the pixel transistors, wherein each pixel is disposed at respective intersections between the data lines and gate lines arranged longitudinally and latitudinally, respectively;

a data driver circuit for driving the data lines;

gate driver circuits for driving the gate lines; and a precharge circuit for precharging the data lines, wherein said pixel matrix, said data driver circuit, said gate driver circuits and said precharge circuit are all manufactured on the same substrate, said data driver circuit and said gate driver circuits are formed outside a sealing region located outside said pixel matrix, and all the data lines formed between said data driver circuit and said pixel matrix, all the data lines formed between said precharge circuit and said pixel matrix, and all pseudo-wiring of a metal layer being composed of the same metal as that of said data lines disposed from said precharge circuit toward a peripheral edge portion of said substrate are each substantially covered, respectively, by at least one metal layer which is composed of a different metal from that of said data lines and said pseudo-wiring;

wherein said metal layer is adapted to perform both light shielding and reduction of electrostatic coupling capacitance between said data lines.

13. An active matrix liquid crystal display device according to claim 12, further comprising a shielding structure of said gate lines formed between said gate driver circuits and said pixel matrix, said shielding structure comprising a metal layer formed so as to be substantially the same as that for said data lines.

14. An active matrix liquid crystal display device according to claim 12, wherein said metal layer is a light shielding metal film provided to light shield a pixel thin-film transistor.

15. An active matrix liquid crystal display device comprising:

a pixel matrix composed of pixels that have pixel transistors, liquid crystal capacitance and storage capacitance, wherein said liquid crystal capacitance and said storage capacitance are connected to data lines through the pixel transistors, wherein each pixel is disposed at respective intersections between the data lines and gate lines arranged longitudinally and latitudinally, respectively;

a data driver circuit for driving the data lines;

gate driver circuits for driving the gate lines; and a precharge circuit for precharging the data lines, wherein said pixel matrix, said data driver circuit, said gate driver circuits and said precharge circuit are all manufactured on the same substrate, said data driver circuit and said gate driver circuits are formed outside a sealing region located outside said pixel matrix, and, respectively, between the data lines formed between said data driver circuit and said pixel matrix, between the data lines formed between said precharge circuit and said pixel matrix, and between pseudo-wiring of a metal layer being composed of the same metal as that of said data lines disposed from said precharge circuit toward a peripheral edge portion of said substrate, at least one metal layer composed of a different metal from that of the data lines is provided;

wherein said metal layer is adapted to perform both light shielding and reduction of electrostatic coupling capacitance between said data lines;

wherein no part of said metal layer is disposed directly above or below any of said data lines.

16. An active matrix liquid crystal display device according to claim 15, further comprising a shielding structure of said gate lines formed between said gate driver circuits and said pixel matrix, said shielding structure comprising a metal layer formed so as to be substantially the same as that for said data lines.

17. An active matrix liquid crystal display device according to claim 15, wherein said metal layer is a light shielding metal film provided to light shield a pixel thin-film transistor.

18. An active matrix liquid crystal display device comprising:

a pixel matrix composed of pixels that have pixel transistors, liquid crystal capacitance and storage capacitance, wherein said liquid crystal capacitance and said storage capacitance are connected to data lines through the pixel transistors, wherein each pixel is disposed at respective intersections between the data lines and gate lines arranged longitudinally and latitudinally, respectively;

a data driver circuit for driving the data lines;

gate driver circuits for driving the gate lines; and a precharge circuit for precharging the data lines, wherein said pixel matrix, said data driver circuit, said gate driver circuits and said precharge circuit are all manufactured on the same substrate, said data driver circuit and said gate driver circuits are formed outside a sealing region located outside said pixel matrix, and, respectively, between the data lines formed between said data driver circuit and said pixel matrix, between the data lines formed between said precharge circuit and said pixel matrix, and between pseudo-wiring of a metal layer being composed of the same metal as that of said data lines disposed from said precharge circuit toward a peripheral edge portion of said substrate, plurality of metal layers composed of the same metal as that of the data lines is provided;

wherein said metal layer is adapted to perform both light shielding and reduction of electrostatic coupling capacitance between said data lines; and wherein no part of said metal layers is disposed directly above or below any of said data lines or said pseudo-wiring.

19. An active matrix liquid crystal display device according to claim 18, further comprising a shielding structure of said gate lines formed between said gate driver circuits and said pixel matrix, said shielding structure comprising a metal layer formed so as to be substantially the same as that for said data lines.

* * * * *